United States Patent
Vajna et al.

(10) Patent No.: US 10,867,190 B1
(45) Date of Patent: Dec. 15, 2020

(54) METHOD AND SYSTEM FOR LANE DETECTION

(71) Applicant: Almotive Kft., Budapest (HU)

(72) Inventors: Szabolcs Vajna, Gyongyos (HU);
Csaba Mate Jozsa, Budapest (HU);
Daniel Szolgay, Budapest (HU);
Richard Zsamboki, Budapest (HU);
Daniel Akos Kozma, Budapest (HU)

(73) Assignee: Almotive Kft., Budapest (HU)

( * ) Notice: Subject to any disclaimer, the term of this patent is extended or adjusted under 35 U.S.C. 154(b) by 0 days.

(21) Appl. No.: 16/697,766

(22) Filed: Nov. 27, 2019

(51) Int. Cl.
| | |
|---|---|
| *G06K 9/00* | (2006.01) |
| *G06T 7/13* | (2017.01) |
| *G06K 9/62* | (2006.01) |
| *G06T 7/70* | (2017.01) |
| *G06T 7/593* | (2017.01) |

(52) U.S. Cl.
CPC ..... *G06K 9/00798* (2013.01); *G06K 9/00201* (2013.01); *G06K 9/6262* (2013.01); *G06T 7/13* (2017.01); *G06T 7/593* (2017.01); *G06T 7/70* (2017.01); *G06T 2207/10012* (2013.01); *G06T 2207/20076* (2013.01); *G06T 2207/20081* (2013.01); *G06T 2207/30256* (2013.01)

(58) Field of Classification Search
CPC ........... G06K 9/00798; G06K 9/00201; G06K 9/6262; G06T 7/13; G06T 7/593; G06T 7/70
See application file for complete search history.

(56) References Cited

U.S. PATENT DOCUMENTS

| | | | | |
|---|---|---|---|---|
| 5,170,162 A | * | 12/1992 | Fredericks | G08G 1/056 340/554 |
| 5,859,926 A | * | 1/1999 | Asahi | G06T 9/004 358/1.9 |
| 6,272,179 B1 | * | 8/2001 | Kadono | G06T 9/008 375/240.16 |
| 6,487,320 B2 | * | 11/2002 | Kadono | H04N 19/537 382/243 |
| 7,113,867 B1 | * | 9/2006 | Stein | G06K 9/00805 |
| 8,760,495 B2 | * | 6/2014 | Jeon | H04N 13/178 348/42 |
| 9,475,491 B1 | * | 10/2016 | Nagasaka | B60W 30/18163 |

(Continued)

OTHER PUBLICATIONS

3D Labe Detection—Oct. 2004 pp. 1-4.*
Subaru Driver Assist—May 2018 pp. 1-3.*

*Primary Examiner* — Mia M Thomas
(74) *Attorney, Agent, or Firm* — Wood Herron & Evans LLP

(57) ABSTRACT

Methods, systems, and computer program products for lane detection. An image processing module is trained by machine learning, and used to generate correspondence mapping data based on an image pair of a first and second images. The correspondence mapping data defines correspondence between a first lane boundary group of the first image and a second lane boundary group of the second image. An image space data block of image space detection pairs is then generated based on the correspondence mapping data, and a three-dimensional lane detection data block generated using triangulation based on first and second parts of the image space data block corresponding to respective first and second members of the image space detection pairs.

26 Claims, 13 Drawing Sheets

(56) References Cited

U.S. PATENT DOCUMENTS

| | | | |
|---|---|---|---|
| 9,892,328 B2* | 2/2018 | Stein | G06T 7/248 |
| 10,192,115 B1* | 1/2019 | Sheffield | G06N 20/00 |
| 2009/0034857 A1* | 2/2009 | Moriya | H04N 19/46 |
| | | | 382/238 |
| 2011/0032987 A1* | 2/2011 | Lee | H04N 19/593 |
| | | | 375/240.12 |
| 2011/0052045 A1* | 3/2011 | Kameyama | H04N 19/30 |
| | | | 382/154 |
| 2011/0286678 A1* | 11/2011 | Shimizu | H04N 19/80 |
| | | | 382/233 |
| 2012/0057757 A1* | 3/2012 | Oyama | G06K 9/00798 |
| | | | 382/104 |
| 2012/0170809 A1* | 7/2012 | Picazo Montoya | G06Q 10/087 |
| | | | 382/103 |
| 2015/0086080 A1* | 3/2015 | Stein | G06K 9/00798 |
| | | | 382/104 |
| 2015/0116462 A1* | 4/2015 | Makabe | B60R 1/002 |
| | | | 348/47 |
| 2015/0371093 A1* | 12/2015 | Tamura | G06T 7/593 |
| | | | 382/103 |
| 2015/0371096 A1* | 12/2015 | Stein | G06T 7/248 |
| | | | 382/103 |
| 2017/0344850 A1* | 11/2017 | Kobori | G06T 7/248 |
| 2018/0225529 A1* | 8/2018 | Stein | G06T 7/248 |
| 2019/0073542 A1* | 3/2019 | Sattar | G06T 7/74 |
| 2019/0362551 A1* | 11/2019 | Sheffield | G06N 20/00 |
| 2020/0098132 A1* | 3/2020 | Kim | H04N 19/48 |
| 2020/0099954 A1* | 3/2020 | Hemmer | G06T 9/004 |

* cited by examiner

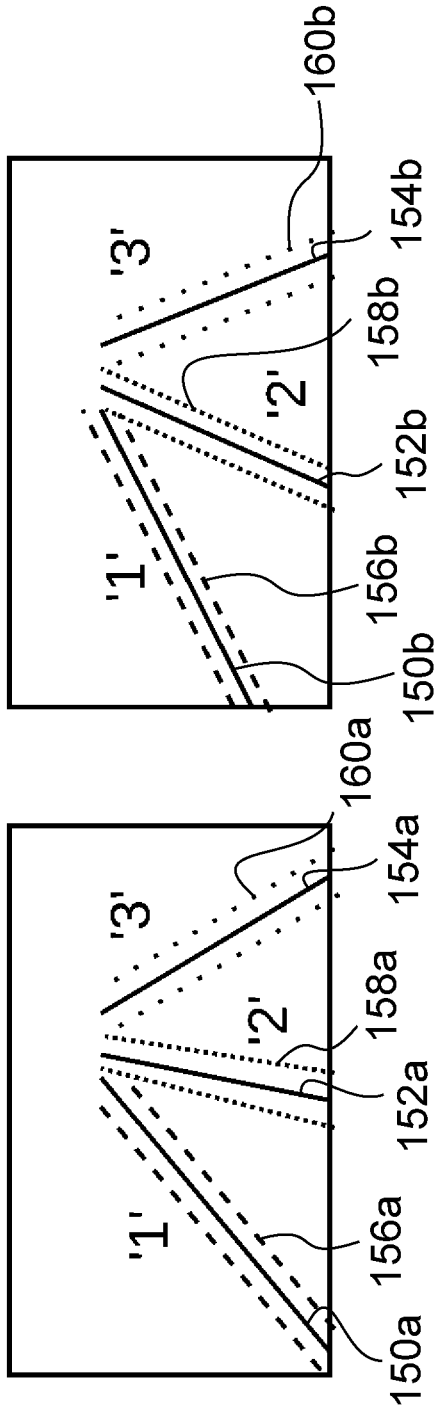

METHOD AND SYSTEM FOR LANE DETECTION

TECHNICAL FIELD

The invention relates to a method and a system for lane detection by means of an image processing module trained by machine learning. The invention relates also to a method and a system for training an image processing module.

BACKGROUND ART

The perception of the three-dimensional environment of road vehicles is crucial in autonomous driving applications. Road surface estimation and the detection of lane markers, or boundaries are necessary for lane keeping and lane change maneuvers, as well as to position obstacles at lane level. Lane geometry and obstacle information are key inputs of devices responsible to control the vehicle. Consequently, several approaches and attempts have been made to tackle with the problem of lane detection.

Among prior art lane detection approaches traditional computer vision techniques have been used, wherein the lane markers are searched according to width, orientation, alignment, and other criteria of the objects. Such lane detection approaches are disclosed for example in U.S. Pat. No. 6,819,779 B1, U.S. Pat. No. 6,813,370 B1, U.S. Pat. No. 9,286,524 B2, CN 105975957 A and JP 2002 150302 A.

Further computer vision based approaches have been introduced in:
- András Bódis-Szomorú et al.: "A lane detection algorithm based on wide-baseline stereo vision for advanced driver assistance.", KÉPAF 2009. 7th conference of Hungarian Association for Image Processing and Pattern Recognition. Budapest, 2009.
- Sergiu Nedevschi et al.: "3D Lane Detection System Based on Stereovision", 2004 IEEE Intelligent Transportation Systems Conference, Washington, D.C., USA, Oct. 3-6, 2004.
- Rui Fan et al.: "Real-time stereo vision-based lane detection system", Meas. Sci. Technol. vol. 29, 074005, 2018.

A further type of lane detection approach is disclosed in US 2018/0067494 A1, wherein a 3D point cloud of a LIDAR (Light Detection and Ranging) device is utilized for the lane detection. The main disadvantage of this approach is the use of a LIDAR device, i.e. this approach needs a special, expensive device to achieve lane detection. The use of LIDAR is also disadvantageous from the point of view of "visible" objects, the LIDAR point cloud does not contain information about occluded objects and/or about an occluded side of an object, i.e. the point cloud contains limited spatial information. A similar approach using depth information is disclosed in US 2018/131924 A1.

In US 2018/283892 A1 detection of lane markers in connection with the usage of high definition map is disclosed. In this approach the lane marker detection is done by the help of semantic segmentation, which results in associating a wide region on the image for a lane marker. This approach results in high noise in the 3D projection even if Douglas-Peucker polygonalization is performed for extracting the line segments.

A similar approach to the above approach is disclosed in U.S. Pat. No. 10,055,650 B2, wherein the lane detection is made as a part of object detection, which is performed for verifying a lane among other objects e.g. a peripheral vehicle, a traffic sign, a dangerous zone, or a tunnel.

Similar segmentation and object classification based techniques to the above approach are disclosed in WO 2018/104563 A2, WO 2018/172849 A2, U.S. Pat. No. 9,902,401 B2, U.S. Pat. No. 9,286,524 B1, CN 107092862A, EP 3 171 292 A1 and U.S. Pat. No. 10,007,854 B2 for identifying e.g. lane markers. A method for determining a lane boundary by the help of e.g. a neural network is disclosed in U.S. Pat. No. 9,884,623 B2.

In view of the known approaches, there is a demand for a lane detection method and system which are more efficient than the prior art approaches.

DESCRIPTION OF THE INVENTION

The primary object of the invention is to provide method and system for lane detection, which are free of the disadvantages of prior art approaches to the greatest possible extent.

A further object of method and system for lane detection is to provide an improved approach for lane detection which is more efficient than the prior art approaches. An object of the invention is to provide 3D (three-dimensional) lane detection based on a first and second image using machine learning.

The objects of the invention can be achieved by the method and system for lane detection according to claim 1 and claim 13, respectively; the method and system for training a neural network according to claim 25 and claim 26, respectively, as well as the non-transitory computer readable medium according to claim 27. Preferred embodiments of the invention are defined in the dependent claims.

In order to illustrate the invention by the help of a typical embodiment, the followings are hereby disclosed. In a typical embodiment the method and system according to the invention (see also below the possible generalizations), the 3D lane detection is made based on raw detections of the lane boundaries for the input images (defining the position of lane boundaries on the images), as well as on correspondence mapping giving correspondences between the raw detections of the two images (defining corresponding pairs of lane boundaries on the stereo image pair). The raw detections and the correspondence mapping are the outputs of the image processing module (unit) applied in this embodiment of the method and system according to the invention. Thus, a direct identification of the positioning of the lane boundaries is done according to the invention (based on e.g. the centerline of a lane boundary marker). This constitutes an approach being different from the above introduced segmentation based known techniques (cf. Davy Neven et al., Towards End-to-End Lane Detection: an Instance Segmentation Approach, 2018, arXiv: 1802.05591; Yen-Chang Hsu et al., Learning to Cluster for Proposal-Free Instance Segmentation, 2018, arXiv: 1803.06459, see also below; preferably, compared to these approaches it has been solved according to the invention how can processed the stereo information efficiently), since in these known approaches the lane boundary markers have been searched by the help of a segmentation approach performed by the help of a machine learning algorithm, i.e. the boundary markers have been investigated as a patch on the image, similarly to any other object thereon.

According to the section above, an image processing module trained by machine learning is used in the method and system according to the invention in general. However, the use of this image processing module is illustrated by the use of a neural network being an exemplary implementation thereof. The illustration of the neural network also shows that several parameters and other details of a selected machine learning implementation are to be set.

BRIEF DESCRIPTION OF THE DRAWINGS

Preferred embodiments of the invention are described below by way of example with reference to the following drawings, where FIGS. 7A and 7B are schematic drawings, illustrating exemplary first and second camera image showing lane boundaries and the correspondence mapping in a further embodiment.

MODES FOR CARRYING OUT THE INVENTION

The invention is a method and a system for lane detection. In the framework of the invention, this means that as a result of the method or system according to the invention 3D (three-dimensional) lane detection data is obtained based on the input images. More particularly, preferably, a 3D representation of 3D lane boundaries is the result obtained based on an image pair (preferably taken by a vehicle going along the lanes to which the lane boundaries correspond). The flow diagram of an embodiment of the method and the system (considering the method, the blocks corresponding to stages or data blocks, as well as considering the system, the blocks corresponding to modules or data blocks) is illustrated in FIG. 1.

Figure 1:
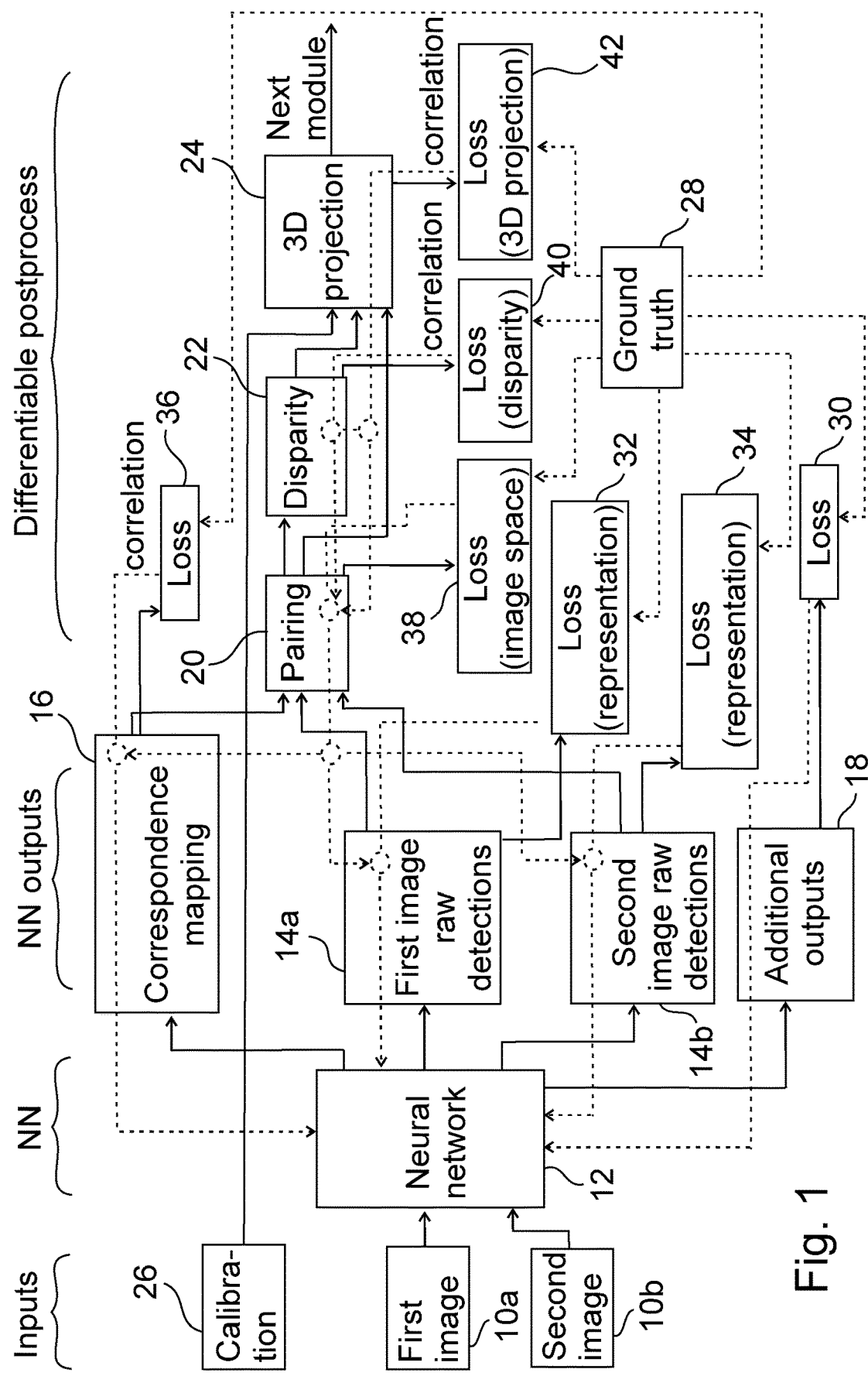
FIG. 1 is a flow diagram illustrating an embodiment of the method and system according to the invention.

The method according to the invention comprising the steps of generating as output data in an image processing step, by means of an image processing module trained by machine learning, based on an image pair of a first image and a second image (a first image 10a and a second image 10b in the embodiment of FIG. 1) correspondence mapping data determining correspondence between a first lane boundary group of the first image and a second lane boundary group of the second image, generating, in a pairing step (may be also called as an image space detection data generation step), a data block of image space detection pairs based on the output data, and generating, in a 3D lane detection data generation step, a 3D lane detection data block by means of triangulation, using calibration data corresponding to the first image and the second image, based on a first data block part of the data block of image space detection pairs corresponding to a first member of the image space detection pairs, and a second data block part of the data block of image space detection pairs corresponding to a second member of the image space detection pairs.

Naturally, 3D may be written as three-dimensional in the respective names.

The—first or second—lane boundary group is the group of lane boundaries that can be found in the respective images. A lane boundary group may comprise one or more lane boundaries, but, in a marginal case, the number of lane boundaries may be even zero in an image. This is reflected also by the name "lane boundary group" which does not show that there is a plurality of lane boundaries or zero lane boundary are comprised therein. Accordingly, the correspondence mapping data gives the correspondences between the groups of lane boundaries about which groups it is not known in advance how many lane boundaries are comprised in them.

According to the above introduction of the invention, generally, correspondence mapping data is generated in the method according to the invention. As will be shown below, in some embodiments the correspondence mapping data is incorporated into a separate correspondence mapping data block (see also the next embodiment). Typically, in the embodiments with separate correspondence mapping data blocks, raw detection data blocks are also defined as outputs of the image processing module.

However, different realizations of the correspondence mapping data are conceivable. In an embodiment, only the correspondence mapping data is utilized in further calculations of the 3D lane detection data, and no raw detection data is utilized at all. For the purpose of illustration, an example is introduced by Tables 8a-8d below (however, in Tables 8a-8d, raw detections are also defined besides the correspondence mapping data): the coordinates corresponding to the non-zero values of the correspondence mapping data give a good approximation for the arrangement of the lane boundary, and—utilizing the coordinate grid if necessary—this data is utilized alone to have image space detections and 3D coordinates for the lane boundaries. The quality of this approximation is limited by the resolution of the correspondence mapping data. If the resolution of the correspondence mapping data is similar to the resolution of the input images, the raw detections would be interpreted as a neglected, small correction to the coordinates of lane boundaries inferred from the correspondence mapping data. In this case, the correspondence mapping data further defines—besides its main purpose of determining correspondence—the arrangement of each first member of the first lane boundary group and the arrangement of each second member of the second lane boundary group.

Furthermore, such a case is also conceivable in which the correspondence mapping data is incorporated into the raw detections from the beginning, thus only those raw detection data elements are comprised in the raw detection data blocks for which the correspondence is high. This filtering can be done also in the case when a separate correspondence mapping data block is defined.

In summary, correspondence mapping data (and other outputs in other embodiments like the raw detections) is generated by the help of the image processing module trained by machine learning (i.e. an image processing module—implemented e.g. by a neural network—which is trainable by machine learning to generate correspondence mapping data and other possible relevant outputs) in all embodiments of the invention in a suitable form. In other words, data responsible for determining correspondences between the lane boundaries of the first image and second image is defined in all embodiments. The trained image processing module is thus—described by other words—a trained machine learning model.

In the above introduction of the invention, the correspondences are determined between the first and second lane boundary detection groups of the respective first and second images. These groups may comprise one or more lane boundaries (corresponding to each lane boundary observable on the respective first or second image), but may comprise also zero detection in a borderline case when no lane boundary is detected on the images (then all the information on the image correspond to the background, see below for differentiating between foreground and background).

It is also noted here, that in the pairing step (all of) the output data generated in the image processing step is utilized for generating the data block of image space detection pairs, i.e. if there is only correspondence mapping data it is utilized only, but if there are raw detection data blocks these are utilized also. In some embodiments below it is also specified, what is comprised in the output data forwarded to the pairing step.

As shown below, the triangulation is the most general approach based on which the 3D lane detection data block can be calculated. Triangulation is a method of calculating the 3D position based on point correspondences found in multiple images of a point-like object (e.g. a specific point of an object). The corresponding set of points define a set of rays starting from the corresponding camera centers (origin of the camera coordinate system). The 3D coordinates of the object are calculated as the intersection of rays, which results in a linear system of equations. If the point correspondences are not perfect, the rays may not intersect. In this case the estimated 3D position may be defined as the point lying closest in perpendicular distance to the rays. Alternatively, the minimal refinement of the correspondences can be determined numerically, such that the refined correspondences satisfy the epipolar constraint, that is, the corresponding rays intersect (Section 12.5 of the below referenced book, which section is hereby incorporated by reference). Calculation based on disparity is a special variant of triangulation. For more details about triangulation see e.g. Richard Hartley and Andrew Zisserman (2003). *Multiple View Geometry in computer vision*. Cambridge University Press. ISBN 978-0-521-54051-3. Calibration data corresponding to the first image and the second image is also to be used for the triangulation, since the arrangement of the images compared to each other can be defined satisfactorily if calibration data is taken into account.

In an embodiment, raw detections are also defined during the method. In this embodiment of the method the correspondence mapping data is comprised by a correspondence mapping data block (e.g. the correspondence data block 16 of FIG. 1 labelled as 'correspondence mapping'), and the output data further comprises a first image raw detection data block 14a for defining arrangement of each first member of the first lane boundary detection group, and a second image raw detection data block 14b for defining arrangement of each second member of the second lane boundary detection group.

See the embodiment of FIG. 1 for a first image raw detection data block 14a, labelled as 'first image raw detections'. Typically, a raw detection data block comprise data of one or more raw detections. In case of zero raw detections, the result of the method is that no lane boundaries are found and, therefore, no 3D coordinates can be assigned to them. A single detection means a single finite value parameter corresponding to distance or another parameter as shown below. See FIG. 1 also for a second image raw detection data block 14b labelled as 'second image raw detections'. These data blocks are called raw detection data blocks since these correspond to raw detections of the respective data (data defining the arrangement of a lane boundary), which raw detections are to be processed.

According to the above introduction, arrangement of the lane boundaries may be defined by raw detection data block, and, alternatively, by the help of the correspondence mapping data itself. These two alternatives give two main possibilities. Moreover, when the arrangement is defined by the help of raw detections, two subcases can be introduced as detailed below. In the first subcase, raw detections and correspondence mapping are independent outputs of the image processing module (see e.g. Tables 1a-1c below). However, in the second subcase, raw detections and correspondence mapping data are obtained as output in such a way that the raw detections serve substantially as inputs for the correspondence mapping data (see the model-based embodiment below).

In the above introduction of the method according to the invention calculations on data blocks are defined. For the interpretation of 'data block' see the details below (e.g. a data block can be represented by a tensor); in general, a data block is a block of data (where the block has arbitrary shape), the members of the data block are typically numbers as illustrated by the examples below.

It is also mentioned here—as will be used in many embodiments—that in an embodiment the image pair of the first image and the second image is a stereo image pair of a left image and a right image (for taking a stereo image, it is typically restricted to make the two images at the same time, and it is preferred that the two imaging cameras are in the same plane). Although, the first image and a second image can be from any relative orientation of the imaging apparatus and made with different timing if a such way produced first image and second image has sufficient overlap for detection.

According to the details given above, for lane detection purposes, the lane boundary is preferably defined as a continuous curve dividing the drivable road surface into lanes. In cases where the lanes are bounded by lane markers, the lane boundary preferably follows the centerline of the lane boundary markers, which can be continuous (single or double) or can have some simple or more complex dashing. Alternatively, the lane boundary may also be another specific line corresponding to the sequence of lane markers (it may run along the right or left side thereof, or anywhere else therein). Thus, the lane boundary is preferably a single line (with no width dimension), e.g. a double closed (continuous) lane marker is also projected to a single line. It can be the case—depending e.g. on regulations of a country—that the side lane boundary (i.e. that side of a lane which is at the side of the road itself) of a lane is not marked by lane boundary markers. Thus, this lane boundary (roadside is also covered by the name 'lane boundary') is a simple transition between the road and the area next to the road (it can be a pavement, a grass covered area, gravel etc.).

It is a great advantage of the present solution according to the invention that it can handle also this type of lane boundary. During the learning process the image processing module or in the specific implementation, the neural network (by the help of application of appropriate type ground truth images) is able to learn also such type of lane boundary (the network searches for this type of transitions, which can also be approximated by a single line, on an image) and it can recognize this in use. Therefore, this different type of lane boundary can be identified in the similar way as lane boundaries with lane boundary markers without the need of a conceptual change in the approach (the annotation technique is also the same). Accordingly, both boundaries (i.e. its boundaries on both sides) of a lane can be preferably modelled by the help of the invention.

In the pairing step—and in the pairing module below— detection pairs are identified. These can be e.g. represented in a single block with a channel-like parameter for the first and second detection (see FIG. 1, where this output is given as a single output to the next module), or can be e.g. represented by more separated data blocks for the first and second images, see the examples below (a separate first and second image space detection data block for the correspondence mapping data block and the respective first or second image raw detection data block; the image space detection data blocks may also be the part of a larger data block obtained in the pairing step). In the pairing step such detections are identified which constitute pairs based on which e.g. disparity can be calculated.

In the pairing step (and, consequently, in the pairing module 20) image space detections are obtained. These can have single tensor or two tensor representation as given above. There is a respective first and second data block part of the data block of image space detection pairs corresponding to a respective first and second member of the image space detection pairs. From the data block of image space detection pairs it is always derivable which parts correspond to the respective members of the pairs, i.e. the first and second data block part thereof can be defined (see e.g. the two tensor representation of Tables 2b and 2c, or 6b and 6c; the separation of the data can be also done for single tensor representation). The corresponding system according to the invention (preferably, adapted for performing the method according to the invention), which is also suitable for lane detection, comprises

- an image processing module (implemented by an image processing module 12 in the embodiment of FIG. 1, labelled as 'neural network' according to the main element of the module in the embodiment) trained by machine learning, adapted for generating as output data, based on an image pair of a first image and a second image, correspondence mapping data determining correspondence between a first lane boundary detection group of the first image and a second lane boundary detection group of the second image (raw detection data block can be also introduced in an embodiment of the system),
- a pairing module (a pairing module 20 in the embodiment of FIG. 1, labelled as 'pairing') adapted for generating a data block of image space detection pairs based on the output data, and
- a 3D projection module (a 3D projection module 24 in the embodiment of FIG. 1, labelled as '3D projection'; this module is adapted for 3D projection) adapted for generating a 3D lane detection data block by means of triangulation, using calibration data corresponding to the first image and the second image, based on
  - a first data block part of the data block of image space detection pairs corresponding to a first member of the image space detection pairs, and
  - a second data block part of the data block of image space detection pairs corresponding to a second member of the image space detection pairs.

Preferably, the system (or, equivalently, it can be considered to be an apparatus) can be realized by comprising
- one or more processors; and
- a memory coupled to the one or more processors and including program code that, when executed by the one or more processors, causes the system to perform the tasks (functions, i.e. the steps defined in the corresponding embodiment of the method according to the invention) performed by the modules introduced according to the above definition of the system, more particularly to generate the various quantities which are generated in the modules above.

The modules above give a task-oriented apportionment of the subassemblies of a computer, it can be also considered in a way that the system (apparatus) itself is responsible for the various tasks.

As it is clear also from the method, the disparity data is not needed to be calculated in all cases. For a system, this means that it is not necessary that it comprises a disparity module. The system comprises the disparity module if the calculation of the 3D lane detection data block is based also on this data (this is preferably scheduled in advance).

A summary of the method and system according to an embodiment of the invention is given in the following points (in respect of some points, further generalizations are given in the description):
1. Inputs:
   a. Image pair (preferably, stereo, rectified)
   b. Calibration
2. Image processing module (Arbitrary, except constraints on input and output, implemented e.g. by neural network):
   a. Input (the image processing module can be fed with stereo input)
   b. Output:
      i. Correspondence mapping
      ii. Raw detections on the separate images
      iii. Optional arbitrary outputs for additional tasks
3. Pairing module
4. 3D projection module Certain embodiments of the invention relate to a method and a system for training the image processing module (e.g. neural network) applied in the method and system for lane detection according to the invention as introduced above. This training method and system is introduced in parallel with the method and system for lane detection; the training method and system uses loss functions as introduced herebelow. Since loss modules (or stages) are also illustrated in FIG. 1, it illustrates both the method and system for lane detection, as well as the method and system for training an image processing module.

A key building part of the invention is the machine learning implementation utilized in the image processing module which introduces the use of annotations and helps to avoid handcrafted parameter setting. The image processing module trained by machine learning is preferably implemented by a neural network (i.e. it is utilized in the image processing module), but e.g. decision tree, support vector machine, random forest or other type machine learning implementation may also be utilized. In general, a trained machine learning model (thus the image processing module trained by machine learning) is a wider class of artificial intelligence than neural network, which class comprises the approach using a neural network.

The (learnable) parameters of an image processing module trained by machine learning are optimized during the training, through minimizing a loss function. The parameters are preferably updated such that it results in lower loss values, as a result, the loss is also being controlled during the training. The loss function corresponds to the objective of the image processing module trained by machine learning, i.e. the loss function depends on what kind of outputs are expected after the machine learning procedure has been done. For example, it is not preferred if the image processing module trained by machine learning places the detections far from the lane boundaries (may also be called separator), thus, a high loss corresponds to the detections placed far from the ground truth. In another example it can be considered smaller error if the image processing module trained by machine learning cannot decide about a marker whether it is dashed or continuous than if the error is in the decision for a point whether it is the part of the foreground or the background. Accordingly, the members of the loss function being responsible for different errors may be weighted.

The loss function quantifies the difference between the prediction (the output of the image processing module) and the reference output (ground truth) that we want to achieve. The loss function may comprise various elements, such as detection loss in image space, detection loss in 3D, etc., and may be introduced at different blocks of the lane detection system.

Advantageously, the system according to the invention is preferably fully differentiable in a preferred embodiment using neural network as image processing module trained by machine learning. Then all gradients of the loss functions can be calculated by backpropagation, that is, gradients can flow through the various modules, back to every parameter and to the input parameters of the neural network (dashed lines in FIG. 1). The neural network, the neural network outputs, the disparity module and the 3D projection module are naturally differentiable. In contrast, the pairing module has to be constructed such that it becomes differentiable. In an embodiment the gradients coming from other modules and going through the pairing module propagates back to the modules of the first image raw detection data block 14a and the second image raw detection data block 14b, as well as it may optionally propagate to the module of correspondence mapping data block 16. Thus, the learning procedure can be done for the whole system in a unified way.

The gradients of the loss function are used to update the values of the learnable parameters of the neural network. As the gradients flow back through the various modules, the loss function may not only optimize the learnable parameters of the module it is assigned to (see FIG. 1 for various loss modules), but also the whole neural network preceding the module. Some neural networks are designed such that different parts have to be trained separately in order to achieve good performance. In contrast, the present invention provides an end-to-end trainable solution, and it does not require a complex training procedure.

The main blocks and the information flow among them are illustrated in FIG. 1, i.e. FIG. 1 gives a modular description of the 3D lane detection system according to the invention, and also corresponding 3D lane detection method according to the invention can be interpreted based on FIG. 1. In FIG. 1, also ground truth data 28 is illustrated by a block (i.e. a module adapted for forwarding the ground truth data). The module of ground truth data 28 is preferably connected with all loss modules for the calculation of loss in these modules.

To sum up, a loss module is preferably assigned to each of the modules, which drives the neural network during the learning procedure to give such an output as the ground truth.

In FIG. 1, the information flow during inference mode (i.e. usage of the method and system for 3D lane detection) is illustrated by solid arrows (forward path). During training, information is propagated backwards from the loss modules to the neural network along the dashed lines. The dashed lines correspond to data connections via which the data propagates back from loss modules. In the modules on the way of this data, the dashed lines are connected to each other via dashed circles; the connections via dashed circles have only illustration purposes, the data packets coming from the respective loss modules travel to the image processing module 12 parallelly. The loss modules have a special role since these are used only during the learning procedure of the neural network. Thus, the loss modules could have been separated by the help of the illustration in FIG. 1 (e.g. using another type of line for connecting them to the corresponding modules and/or the loss modules themselves could have been separated illustration tools, for example by using other type of rectangle—e.g. dashed—for loss modules in the diagram of FIG. 1).

Additional outputs block 18 refers to additional tasks performed by the neural network, which may be closely or weakly related to lane detection, e.g. road segmentation, traffic object detection, lane type determination, etc. Additional regularization losses may be added to the neural network, which are not indicated in this figure. The additional outputs block 18 preferably has its own loss module 30.

The output of the 3D projection module (i.e. of the whole 3D lane detection system) can be the input of other modules in an automated driving application (illustrated by an arrow outgoing from 3D projection module 24 with label "next module"). Furthermore, data of additional outputs block 18 can also be made available for other modules.

E.g., the extracted 3D lane boundaries may be used in online camera parameter estimation, in motion planning or trajectory planning, localization, or any other module which may benefit from the 3D position of lane boundaries. Optionally the 3D detections of the lane detection system can be an input of a sensor fusion algorithm which determines the (3D) road model from various sources, such as lane detection, road segmentation, object detection, and from various sources, such as camera, lidar or radar.

FIG. 1 shows the inputs of the image processing module 12 (labelled simply as "Inputs" in the header of FIG. 1; the header shows the consecutive stages of the system and the corresponding method). It has two image inputs (in general, a first image 10a and a second image 10b, these can be left and right images). These image inputs preferably give a rectified stereo image pair, arbitrary size and channels (grayscale or RGB, etc.). In principle rectification can be moved to (i.e. realized in) the lane detection system, then the inputs of the image processing module 12 are stereo image pair and calibration data 26, and the first step is the rectification.

Calibration data 26 is an input of the 3D projection module 24. Calibration data describes the intrinsic and extrinsic parameters of the cameras. The extrinsic parameters characterize the relative position and orientation of the two cameras. The intrinsic parameters along with the model of the camera used for interpreting the images determine how a 3D point in the camera coordinate system is projected to the image plane. The calibration data is needed for rectification, but the rectification can be performed in a module being not part of the lane detection system (it is performed before getting into the system). Thus, the lane detection system and method can receive rectified camera images, as well as calibration data describing the rectified camera images. Furthermore, as illustrated in FIG. 1, the calibration data describing the rectified camera images is preferably used for 3D projection.

Rectification of stereo cameras and the corresponding images is a standard method used in stereo image processing, it transforms the cameras and the corresponding images to a simplified epipolar geometry, in which the two camera image planes coincide and the epipolar lines coincide. Points on the image plane represent rays in the camera coordinate system running through the origin. For any points on one of the image planes, the corresponding epipolar line is the projection of the corresponding ray on the other image plane. This means that if a 3D point corresponding to a real object is found on one of the images, its projection on the other image plane lies on the corresponding epipolar line. For more details about rectification see e.g. Bradski, G., Kaehler, A.: O'Reilly learning OpenCV. 1st (edn), ISBN: 978-0-596-51613-0. O'Reilly Media Inc., NY, USA (2010).

Introducing the image processing module 12 (provided with a separate label "NN" in the header of FIG. 1), first the architecture of the neural network applied therein is described. A neural network applies a series of transformations to the inputs in order to produce the desired outputs. These transformations may depend on learnable parameters, which are determined during the training of the neural network. In most applications, these transformations form a layered structure, where the input of a layer is the output of previous layers. These inputs and outputs of the layers are referred to as features. The neural network used in the 3D lane detection system may contain arbitrary number and types of layers, including but not restricted to convolutional layers, activation layers, normalization layers, etc. The sequence of the layers (or more generally, transformations) is defined by the neural network architecture. In the invention, preferably, the so-called stereo lane detection neural network receives a stereo image pair (consists of a first image and a second image) as input, which must be respected (processed) by the neural network architecture.

In the image processing module, the processing may start separately on the first image 10a and the second image 10b, which might be beneficial for the low-level filters to focus on a single image, e.g. to form edge or color detectors. The two branches of the network may or may not use the same filters (weights). Filter sharing reduces the number of learnable parameters (weights). Accordingly, common filters may be preferably used parallelly in the two branches to search for the same features. However, it is also allowed that the filters learn independently on the two branches. This latter is preferred in case the first camera and the second camera are not equivalent.

In the embodiment of the lane detection system according to the invention using neural network in the image processing module trained by machine learning (naturally, those features which are introduced in connection with the system can be applied in the framework of the method as well, if there is no hindrance for it), the features of the two images are combined in the network at least once before the output layer of the image processing module (i.e. a mixing step is inserted). The feature combination (i.e. the mixing) could possibly be done already on the input images, or at a latter layer. The combination (mixing) may be implemented for example as feature concatenation, addition, multiplication, or a nonlinear function of the input features.

Assuming that first and second features are to be mixed, these features may be represented as tensors, which may have height, width, channel dimensions (or e.g. additionally batch, and time dimensions). The mixing appears in many cases only in the channel dimension. In principle more complicated mixings can be defined, where the elements of the tensors to be combined are mixed not only in the channel dimension, but also in the spatial dimension.

It is relevant to note in connection with the above introduced approach of mixing that the output of the neural network is compared (confronted) to the ground truth data. Since mixing helps to get reasonable correspondence mapping, it is the task of the neural network (performed during the learning process by selecting e.g. the appropriate weights) to reach an output being close to the ground truth based on the data being the output of the mixing.

This step of mixing (may be also called combination) is preferred for the neural network of the 3D lane detection system to determine outputs that depend on both images (correspondence mapping is such an output), e.g. the correspondence mapping data block defined in the outputs section. The mixing of the first and second camera features also enhances correlation between the errors (difference between the prediction and the ground truth) of the outputs corresponding to the first and second images (e.g. first camera detections and second camera detections defined in the outputs section), which is essential to improve the precision of the 3D coordinates predicted by the lane detection system according to the invention. This can be explained by the principle that positive correlation between random variables reduces the variance of their difference.

Enhancing correlation between the errors is about the following. During the use of the neural network, it will find the lane boundary markers, but—unavoidable—with some error (to left or right direction). Without mixing it is not enhanced explicitly, that the error is consistent on first and second images.

Thus, in an embodiment of the method applying mixing, in which the image processing module is implemented by a neural network, the neural network has a first branch for (i.e. adapted for being applied on or adapted for using on) the first image and a second branch for the second image, and the method comprises, in the course of the image processing step, a combination step of combining first branch data being a first branch output of the first branch and second branch data being a second branch output of the second branch (instead of this combination step, in the corresponding system: first branch data being a first branch output of the first branch and second branch data being a second branch output of the second branch are combined in the image processing module). More generally, it can be said that, preferably, all the outputs of the image processing module trained by machine learning has access to both input images (it has access, i.e. both image may influence the outputs, but it is not necessary that both influences the outputs), i.e. the processing of the first image and the second image is combined in the image processing module.

The 3D distance of the detected lane boundary points from the camera plane (depth) is inferred from the disparity, which is the difference between corresponding first image and second image detections. Without mixing, the detection errors on the two images are independent (uncorrelated), and mixing can reduce the variance of the inferred depth values.

The following remark is given in connection with the above sections. Without changing the outputs of the neural network and the following modules, image pairs from more than one consecutive frame can be processed similarly to the per frame case. The simplest implementation is to use the original per frame architecture and concatenate the RGB or grayscale channels of the consecutive frames in left and right image input. The target can be chosen to be the original target of the last frame. Information from previous frames (first and second image) may make the output more robust to per frame noise e.g. caused by windshield wiper (i.e., preferably, the image processing module generates its output for a frame considering at least one previous frame). More generally, it can be handled like the stereo image pair, that is, by a mixing of parallel processing and feature combination.

In summary, in an embodiment, in the image processing step (or in the system: the generation of the output data by means of the image processing module), is based on, in addition to actual frames of the first image and the second image being the input data, at least one additional frame of the first image and the second image preceding or succeeding the actual frames. If succeeding frames are used these are needed to be waited for.

According to embodiment of FIG. 1, the neural network of the 3D lane detection system has preferably three characteristic outputs (labelled as "NN outputs" in the header of FIG. 1):

1. First camera detection (first image raw detection data block 14a)
2. Second camera detection (second image raw detection data block 14b)
3. Correspondence mapping (correspondence mapping data block 16)

Preferably, these are also the characteristic outputs of other embodiments.

Arbitrary further outputs could be added for additional tasks, such as clustering, lane type segmentation, road segmentation, vehicle or pedestrian segmentation, etc. Further outputs are comprised in the additional outputs block 18 in FIG. 1. See details about the outputs herebelow.

Raw detections are (neural) representations of lane boundaries on the images. Lane boundaries can be represented in various ways by a neural network. For example, representations may be dense (e.g. pixelwise classification or regression of lane boundary points) or model-based (e.g. polynomial, spline parameters; see details at the introduction of the model-based embodiment). The output of the image processing module of the 3D lane detection system may be in arbitrary representation, some embodiments showing exemplary representations of the raw detections are introduced below.

Note, that the representation of the raw detection is not restricted according to the invention, by the help of the exemplary embodiments it is intended to show that various representations are conceivable within the framework of the invention.

The architecture introduced in the previous section produces correlated (see above where the enhancement of correlation is detailed) first and second camera detections, as they have access to features of the other viewpoint and/or to the mixed features. The possibility to access information from the other camera can increase the quality of the detections on the images. However, if the correlation is not explicitly enhanced during the training e.g. by a suitable loss function, this correlation between the detections remains small. To obtain 3D consistent detections we use loss functions which strengthen the correlation between the detection errors.

The raw detections may only represent the position of the (centerline of the) lane boundaries, or they can describe other characteristics, such as the direction of the lane boundary segments or the type of the separator, etc. (see below for examples showing how this information is optionally built to the framework of the invention). It is noted that some characteristics of the separator e.g. the lane type can be more naturally incorporated in the correspondence mapping output.

Comments on loss on the raw detections are given in the following. During training, the raw detections may obtain a representation loss (see loss (representation) modules 32 and 34 in FIG. 1), which characterizes the difference between the ground truth representation of the lane boundary and the raw detections. The mathematical form of the loss function is chosen according to the representation. E.g. if the representation corresponds to a regression problem (see also below), a natural choice can be the Euclidean ($L_2$) distance or the Manhattan ($L_1$) distance ($L_1$ and $L_2$ loss can also be used in the model-based embodiment, see below; however that case the difference in the model parameters occurs in the loss, not the distance of image points). Here $L_p$ refers to the distance related to the p-norm in vector fields. E.g. if a and b are vectors with components $a_i$ and $b_i$, the distance between a and b can be characterized by the p norm of their difference, $$\|a-b\|_p = \left(\sum_i |a_i - b_i|^p\right)^{1/p}$$

In the loss functions, usually the $p^{th}$ power of the distance is used, see Eq. (6) for an example of an $L_p$ loss.

If the raw detections originate from a classification problem, standard classification losses can be applied, e.g. softmax loss (Eq. (9)) or SVM loss (support vector machine loss). In general, arbitrary convex functions can be applied as a loss, which has a minimum when the prediction equals the ground truth value.

This representation loss does not directly encourage the network to produce correlated detection errors in contrast to the disparity loss and the 3D projection loss.

The other characteristic output of the 3D lane detection network is the correspondence mapping, which is introduced herebelow. The correspondence mapping determines the correspondence between lane boundaries on the input first and second images preferably represented as raw detections, and eliminates the need for running a separate stereo matching algorithm greatly reducing computational time. Various solutions might exist for the neural representation of the correspondence between the detections of the first and second image; a few distinct examples of the correspondence mapping are described herebelow in connection with some embodiments.

The correspondence mapping may be considered as correspondence between abstract entities (e.g. lane boundaries), which may or may not have visual appearance in the input images, however the contextual information gives the possibility of predicting the descriptors (e.g. raw detections) which represent these abstract entities. Thus, this is a completely different approach compared to traditional vision-based stereo matching solutions. Moreover, correspondence mapping is done within the neural network itself (provided as an output; these principles are true in general for image processing modules trained by machine learning), as it provides correspondences between the detections on the stereo image pair. It differs from traditional explicit stereo matching in the following points.

- No handcrafted rules are used for the matching, the rules for correspondences are learned by the neural network during the training stage (it is given as a separated output);
- Correspondence is given between detections (which characterizes the lane boundaries) and not between image patches (note that the standard stereo matching approach searches for correspondences between local patches of the images; see also the following point);
- Correspondence is not based on local similarity of image patches, but on lane boundary descriptors (which can be chosen variously), hence it is reliable even in occluded regions (areas) and for lane boundary part between the lane markers, and is more robust to noise in the images. According to the invention, preferably, the lane markers—when e.g. dashed and not continuous—are not searched in themselves, rather, these are connected and the thus obtained continuous lane boundary is the ground truth annotation, as well as thus searched for and output by the neural network (see e.g. the examples where sample outputs of the neural network are given; in the examples, also results for a continuous lane boundary can be observed). This approach is also advantageous in a far portion of an image, where the dashed boundary markers are not easy to be caught. Thus, for a position between a previous and a subsequent lane boundary marker, a high probability or a label of a lane boundary can be given in the respective embodiments.
- Lane boundaries—considered to be simple shapes—are searched, which do not have typically too complex run on the figure; the separator lane boundaries which are of highest importance are typically straight or bending slowly; this character of the lane boundaries can help also in case of occluded regions.

In principle, the correspondence mapping can be a dense one-to-one matching between the pixels on the two images. However, as it is detailed below, preferably a much simpler mapping is enough for the 3D lane detection system according to the invention. For example, it can be chosen to describe correspondences between regions around the lane boundaries in the two images (see at the introduction of the pairing mask and the stereo instance segmentation).

In connection with the loss on the correspondence mapping, see the following. The correspondence mapping (i.e. the neural network to be able to output correspondence mapping data) is trained with ground truth data during the training procedure (see correspondence mapping loss module 36). The loss function compares the ground truth correspondences with the predicted correspondences and has a minimum where the two correspondences are equivalent. Naturally, based on a ground truth the correspondence can be exactly given in any representation of the correspondence mapping. The correspondence mapping depends on both images; hence the corresponding loss function encourages the network to produce filters which are susceptible to the features of both images.

Accordingly, the system for training the image processing module applied in the system for lane detection thus comprises the step of (in the corresponding method for training the image processing module, the controlling steps below are performed; in the sections below, the reference numbers of the embodiment of FIG. 1 are given, in which embodiment a neural network is used; the loss values are summed up, and have to be minimized during the training) a 3D projection loss module 42 adapted for controlling the 3D lane detection data block during the training of the image processing module by modifying learnable parameters of the image processing module. Furthermore, optionally, it comprises also the step of a correspondence mapping loss module 36 adapted for controlling a correspondence mapping loss of the correspondence mapping data during the training of the image processing module by modifying learnable parameters of the image processing module.

The system may comprise an image space loss module 38 adapted for controlling the first image space detection data block and the second image space detection data block during the training.

According to the above construction, beyond the correspondence mapping loss, the image space loss and/or the 3D projection loss may be controlled. Furthermore, e.g. in the embodiment of FIG. 1 (i.e. in an embodiment in which the circumstances are present for using disparity), the system for training the image processing module further comprises a disparity loss module 40 adapted for controlling the disparity data block based on ground truth data 28 during the training.

In the following embodiment of the system (and method) for training the image processing module applied in the system for lane detection is fully differentiable. In this embodiment the correspondence mapping data is comprised by a correspondence mapping data block and the correspondence mapping loss module is adapted for controlling the correspondence mapping loss of the correspondence mapping data block, the image processing module 12 is implemented by a neural network, and the system further comprising

- a first representation loss module 32 adapted for controlling a first representation loss of the first image raw detection data block 14a during the training, and
- a second representation loss module 34 adapted for controlling a second representation loss of the second image raw detection data block 14b during the training.

To summarize, in this embodiment the machine learning algorithm is implemented by a neural network, all transformations in the neural network are differentiable and the pairing step and the 3D projection steps are differentiable with respect to their inputs depending on the prediction of the neural network, which are utilized during the training, allowing the computation of gradients of the 3D projection loss and the image space loss with respect to the parameters of the neural network.

Moreover, in this embodiment the system for lane detection is fully differentiable in the sense that all the loss functions (including, but not restricted to the 3D projection loss and the image space loss) are differentiable with respect to all the learnable parameters of the machine learning algorithm during training. This is achieved by a differentiable image processing module trained by machine learning, implemented e.g. by a neural network characterized in that all the transformations (layers) are differentiable, furthermore, the pairing step and the 3D projection steps are differentiable with respect to their inputs depending on the prediction of the neural network, which are utilized during the training.

The image processing module (neural network) may use arbitrary representation for the detections and for describing the correspondence among the detections on the two images (see below for exemplary embodiments). The outputs are forwarded to the pairing module 20 (namely, first image raw detection data block 14a, second image raw detection data block 14b and correspondence mapping data block 16 out of NN outputs as illustrated by arrows run from these blocks to the pairing module 20). The pairing module is adapted for mapping the representations to a standardized form, its output is the image space representation of detection pairs (see the tables below for examples). This standardized representation is the input of the disparity block.

As mentioned above, the representation is arbitrary, tensor (matrix) based embodiments are described herebelow (see e.g. the model-based embodiment for a representation being different from the tensor based representation). In such an embodiment of the method and the system the output data is generated for a coordinate grid (i.e. the output data can be interpreted on a coordinate grid) represented by a coordinate grid tensor (in the tensor based approach the coordinate grid is naturally represented by a respective tensor) having a plurality of grid tensor elements, and the first image raw detection data block is a first image raw detection tensor (here and in the next section it is specified that the raw detections are also represented by respective tensors, the resulting tensors are preferably downsampled or upsampled compared to the investigated original image as shown e.g. by the examples) corresponding to the coordinate grid tensor and having a plurality of first tensor elements comprising a respective first distance value, measured from a corresponding grid tensor element, of a closest first lane boundary point of the first lane boundary group (i.e. the point of the closest lane boundary in the search direction) in a first search direction in the first image (as it is disclosed in detail herebelow, in the tensor based approach distances are used for characterizing the arrangement of the lane boundaries; the distances are measured between a respective point of the coordinate grid and the closest lane boundary point in the search direction: accordingly, on a left-right image pair these are horizontal distances), the second image raw detection data block is a second image raw detection tensor corresponding to the coordinate grid tensor and having a plurality of second tensor elements comprising a respective second distance value, measured from a corresponding grid tensor element, of a closest second lane boundary point of the second lane boundary group in a second search direction in the second image (in case of rectification, the search directions are preferably given along an epipolar line, may be in the left or right direction thereon, see also R, L search directions below), and the correspondence mapping data block is a correspondence mapping tensor corresponding to the coordinate grid tensor and having a plurality of third tensor elements characterizing whether the closest first lane boundary point (in the first search direction, as mentioned above) and the closest second lane boundary point (in the second search direction) correspond to the same lane boundary (i.e. correspond to the same lane markers on the first and second image, thus determining correspondence between the first lane boundary group of the first image and the second lane boundary group of the second image; these correspond to the same lane boundary in the reality, i.e. to the same lane boundary marker, if it gives the basis for the lane boundary), and using the coordinate grid tensor, a tensor of image space detection pairs is generated as the data block of image space detection pairs. I.e. this data block is also represented by a tensor.

The first and second image raw detection tensors, as well as the correspondence mapping tensor all correspond to the coordinate grid tensor. Accordingly, these tensors have the same dimensions and define values for the respective points of coordinate grid tensor (see also the exemplary tensors in the Tables below).

The preferably used disparity data block, as well as the 3D lane detection data block can be represented in any form; as Tables 3a and 3b, 7a and 7b show these are e.g. represented in a form of a tensor, however, Tables 10a and 10b show that these can also be represented simply as lists (although different dimension data blocks, like a matrix, a list, are considered to be tensors).

In the tensor based approaches the correspondence mapping tensor—e.g. see embodiments with pairing mask for one correspondence mapping tensor, and embodiments with the stereo instance segmentation for two, namely a separate correspondence mapping tensor for each of the first and second images—comprises information about whether the investigated closest lane boundary points are the points of the same lane boundary or not. Characterization in the third tensor elements can be done e.g. by the help of probability values as demonstrated in some examples; other ways of characterization are also conceivable.

In the following, the introduction of the features of the pairing module 20 is given. The pairing module 20 derives an image space representation of detection pairs from the outputs of the image processing module 12 (i.e. from the raw detections on two images and the correspondence mapping).

How the image space representation is determined depends on the raw detections and the corresponding mapping used in a certain embodiment. However, it is important that the transformation to the image space has to be differentiable (to maintain end-to-end differentiable feature; this expectation can be fulfilled, as it was mentioned above). Then the gradients flow through the pairing module naturally to the features which contribute to the prediction of detection pairs (thus, the training of the neural network can be improved also with loss data originating in a stage being after the pairing module; see the dashed lines for the flow of loss data).

Depending on the certain embodiment, gradients from the pairing module may or may not flow to correspondence mapping (FIG. 1 shows such a connection which can be utilized accordingly). In the examples given below, the pairing module uses ground truth correspondence mapping data during training, consequently gradients flow only to the left and right image raw detections. We note, that the correspondence mapping output is trained directly by the correspondence mapping loss. However, it is possible to construct other examples where gradients flow to the corresponding mapping as well. The difference is whether the 3D loss in the 3D projection module is only used to refine the image space detections or to refine the correspondence mapping as well.

Optionally, an image space loss function can be assigned to the image space representation corresponding to the first and second images (see loss (image space) module 38 in FIG. 1). This loss characterizes the distance between the image space representation of the raw detection and the true image position of the lane boundary. In some embodiments the representation loss of the raw detections is equivalent to the image space loss.

The image space detection pairs output by the pairing module 20 are processed by the disparity module 22, which is described in the following.

The disparity is calculated as the difference between the image coordinates of the first and second image detections along the epipolar direction; in most cases, in the horizontal direction. Accordingly, in a horizontal stereo setup $$\text{Disparity} = u_{left} - u_{right}, \quad (1)$$

where u is image coordinate of the detection along the horizontal axis. The disparity is calculated for all detection pairs and is forwarded to the 3D projection module together with the image coordinates of e.g. the left detections.

A loss function can be introduced on the disparity module to enforce the network to produce correct disparity values (see loss (disparity) module 40 in FIG. 1). This loss enforces the correlation between the first and second camera detections.

Herebelow, also the features of the 3D projection module 24 are introduced. The 3D projection module 24 calculates the 3D coordinates (e.g. in the camera coordinate system, which is in correspondence with the car holding the camera) of the detections. The inputs are the image space representation of detections, the disparity and camera calibration parameters (the latter comes from calibration module as calibration data 26). The 3D position of the lane boundary points can be determined from the corresponding image space positions by triangulation. In the simplest case of rectified cameras, the corresponding image space positions differ only along the epipolar direction, and this difference is characterized by the disparity.

For illustrating an embodiment of the invention, the relevant equations of the disparity based calculations are introduced herebelow, but the method of triangulation is applicable in the more general (non-rectified) setup as well (see above).

In the following, the expressions for determining the coordinates can be found. The indexing used herebelow corresponds to a horizontal stereo arrangement (for the horizontal/vertical arrangement, see below). The depth (co-ordinate Z) is defined as the distance of the detection from the rectified camera plane, and is calculated as:

$$Z = Bf_x / \text{Disparity}, \quad (2)$$

where $f_x$ is the focal length of the rectified camera along the epipolar direction, B is the distance between the two cameras (baseline distance) producing a first image 10a and a second image 10b (in many cases: left and right images) and 'Disparity' is the disparity corresponding to the detection.

If the principal points of the two rectified cameras differ, it must be compensated in the disparity:

$$Z = Bf_x / (\text{Disparity} - (c_{x,left} - c_{x,right})), \quad (3)$$

where $(c_{x,left}, c_{y,left})$ and $(c_{x,right}, c_{y,right})$ are principal points of the left and right cameras. Points on the image plane represent rays in the camera coordinate system running through the origin. The principal point corresponds to the ray perpendicular to the camera plane and is represented by real numbers in pixel units (it is not sure that it coincides with a pixel, since it may have values which are not integer in the coordinates used for pixels).

The X and Y coordinates of the detections are calculated from e.g. left camera detection coordinates and the depth (already calculated).

$$X = (u_{left} - c_x) / f_x \cdot Z$$

$$Y = (u_{left} - c_y) / f_y \cdot Z \quad (4)$$

Where $(c_x, c_y)$ is principal point of the rectified left camera.

The 3D projection is calculated for all detections, and it is the principal output of the 3D lane detection system.

In connection with the 3D projection loss, see the following. The main objective of the 3D lane detection system is to provide accurate 3D information about the lane boundary lines. Hence, a loss function is preferably assigned to the 3D projected detections (see 3D projection loss module 42 in FIG. 1) to train the neural network to make predictions which are projected to the correct 3D position. This step is crucial to reduce the noise of 3D detection from the neural network. As the 3D projection is differentiable (as well as the disparity module), the loss spreads back to the early layers of the neural network (i.e. reduction of noise in 3D detection can be trained to the neural network).

About obtaining ground truth annotations, see the following. The application of a neural network (in general, an image processing module trained by machine learning) requires a large amount of training data to calibrate the learnable parameters of the network. The training data consists of stereo images with labels describing the lane boundary positions in the three-dimensional space, or equivalently the positions projected to the two-dimensional camera planes. These true labels are referred to as ground truth. These could be obtained by manual annotation, that is, by determining the lane boundary lines on real images by human supervision, possibly using some classical or neural network-based detection algorithms as prior.

In addition, training data for the neural network adapted for 3D lane detection can be generated in a simulated environment, e.g. by a simulator capable of generating photo-realistic images (in the simulated environment e.g. the lane boundaries are parametrized, thus these can be labelled). Three-dimensional lane boundary positions may also come from processing a lidar point cloud (since lane boundaries are objects projecting out from the road surface), from classical stereo algorithms, from high density maps, or a fusion of (in other words, in any combination of) the above methods.

Herebelow, see some aspect of training of the model of the neural network. The parameters of the neural network are optimized by minimizing the weighted sum of all loss functions introduced in the system (and the corresponding method), using a suitable optimization method. Arbitrary initialization schemes can be used for the parameters before the optimization.

Herebelow, some details of certain further embodiments of the 3D lane detection system are given. Several slightly different embodiments can be realized with the architecture introduced above. The following embodiments may differ in how the lane boundaries are represented by the neural network and in the representation of the correspondence mapping.

Furthermore, several additional tasks can be assigned to the neural network.

The orientation of the stereo cameras may be horizontal, vertical, or unconstrained. Thus, the input images are called generally first and second images. Without loss of generality the embodiments introduced below assume a horizontal stereo setup, where during rectification, the epipolar lines are chosen to be horizontal. In this embodiment the first and second images are left and right images.

An embodiment being in connection with the raw detections is detailed herebelow. We hereby refer to the tables below, specifying exemplary tensors for the actual data in certain stages of the system and method in various embodiments. In this embodiment, raw detections for the lane boundaries on the left and right images are represented by 2D grids of scalar values (or more generally tensors) $D_{right/left}$ with the subscript referring to the image (see e.g. Table 1b and 1c).

Each element (i,j) of the 2D grid represents an image position $I_{i,j}=(u_{i,j}, v_{i,j})$, which form the coordinate grid (i.e. the coordinate grid can also be described by a matrix of data, generally by a tensor in this embodiment). The image coordinate $(u_{i,j}, v_{i,j})$ might or might not equal to (i,j) based on the downsampling or upsampling of the neural network introduced e.g. by pooling layers, strided convolutions, dilated convolutions. Thus, the coordinates at certain points of the coordinate grid are determined by the structure of the neural network, more particularly by its downsampling or upsampling factor. Furthermore, offsets may be introduced manually in the target, which also modifies the $(i,j) \rightarrow (u_{i,j}, v_{i,j})$ mapping. For example, in a network with $stride_x$ along the horizontal direction and $stride_y$ along the vertical direction (stride gives the up/down sampling factor), $$u_{i,j} = i \cdot stride_x + offset_x$$

$$u_{i,j} = j \cdot stride_y + offset_y \quad (5)$$

$I_{i,j}$ represents the center of the $(i,j)^{th}$ [$stride_x \times stride_y$] cell if $offset_x = stride_x/2$ and $offset_y = stride_y/2$. An example for the coordinate grid is given in Table 2a.

The raw detections $D_{right/left}$ describe the (signed) relative distance of the lane boundary point on the image, measured from the (points of the) coordinate grid, along the epipolar direction. Four independent raw detection tensors on the left and right images (subscript) with Left (L) and Right (R) search directions (superscript) can be defined: $D^R_{left}$, $D^R_{right}$, $D^L_{left}$, $D^L_{right}$, the elements of which describe the relative position of the closest lane boundary in the search direction. The neural network of the 3D lane detection system according to an embodiment of the invention may predict all four independent detection tensors, or in another embodiment only two or three of them. E.g. only $D^R_{left}$ and $D^L_{right}$, i.e. one for the left (first) and one for the right (second) image; by the selection of raw detection tensors to be utilized, the correspondence mapping is also determined. When the selection is made for $D^R_{left}$ and $D^L_{right}$, the correspondence mapping $P^{RL}$ has to be used also (for the definition of the correspondence mapping with various direction indices, see below). Accordingly, in an embodiment the first search direction and the second search direction are selected as left direction on the respective first image and/or second image or right direction on the respective first image and/or second image, respectively. This can be interpreted for any first and second images, not only for left and right images. According to this definition all of the cases of using two, three or four of the raw detection tensors are utilized in the calculations.

The loss function (of the loss (representation) modules 32 and 34 corresponding to the first and second image raw detections 14a, 14b in FIG. 1) penalizes the difference between the predicted and the ground truth relative position of the detections. The simplest choice for the loss function is $$L = \sum_{(i,j) \in F} |D_{pred} - D_{GT}|^p \quad (6)$$

e.g. with p=2, and the same function can be applied for both images and directions, that is, $D_{pred/GT}$ may refer to the predicted or the GT value of any of $D^R_{left}$, $D^R_{right}$, $D^L_{left}$, $D^L_{right}$. The sum goes through a subset F of all possible indices (i,j), which is called foreground. Applying a foreground region close to the lane boundary helps the neural network to focus on regions from which the position of the lane separator can be predicted correctly (i.e. the neural network is provided only with relevant information). E.g. the foreground can be defined as $$F = \{(i,j) : |D_{GT|i,j}| < W\}, \quad (7)$$

where W is an arbitrarily chosen window size; those points of the coordinate grid are selected to the foreground for which the absolute value of the respective tensor element of the ground truth detection in below W, i.e. tensor elements with limited value. This means that only a region is taken into account by the neural network, from which the closest lane boundary is not too far (closer than W). The foreground region may depend on the position of the lane boundary and also may differ for the four raw detection tensors ($D^R_{left}$, $D^R_{right}$, $D^L_{left}$, $D^L_{right}$), such that there may be $F^R_{left}$, $F^R_{right}$, $F^L_{left}$, $F^L_{right}$ corresponding to the raw detection tensors with the same indices:

$$F_{Im}^S = \{(i,j) : |D_{IM,GT|i,j}^S| < W\} \quad S \in \{L,R\}, Im \in \{left, right\} \quad (8)$$

In order to enforce the network to predict reliable detections, in principle, it should also predict a learned foreground output corresponding to each relative detection tensor. In an embodiment the raw detections are the pairs of D and F tensors, which can be represented as a single output with multiple channels or as multiple outputs.

However, we introduce a compact solution in which this additional foreground output is not necessary, because it can be incorporated in the correspondence mapping (see below). In this case the raw detection is simply the raw detection tensor D.

A remark in connection with the above details: Above it is assumed that the raw detections have only one component corresponding to the distance from the coordinate grid to the lane boundary along the epipolar lines. The relative detections may have another component corresponding to the orthogonal direction. If the orthogonal component is not regressed, but chosen to be a constant, it can be incorporated in the $offset_y$ parameter of the coordinate grid. This allows one to increase the density of predictions at fixed stride by introducing multiple D outputs corresponding to different $offset_y$s. In the following we consider scalar relative detections, with a single offset.

Herebelow, some details of an embodiment of the correspondence mapping is given. The correspondence mapping finds correspondences between raw detections on the left image and raw detections on the right image. There are four possible combinations of the left and right image raw detection tensors, which lead to four distinct correspondence mappings ($P^{RR}$, $P^{RL}$, $P^{LL}$, $P^{LR}$), where the two superscripts refer to the search direction on the left and right images respectively:

$P^{RR}$ describes correspondences between $D^R_{left}$ and $D^R_{right}$,
$P^{LL}$ describes correspondences between $D^L_{left}$ and $D^L_{right}$,
$P^{RL}$ describes correspondences between $D^R_{left}$ and $D^L_{right}$,
$P^{LR}$ describes correspondences between $D^L_{left}$ and $D^R_{right}$.

Figure 2:
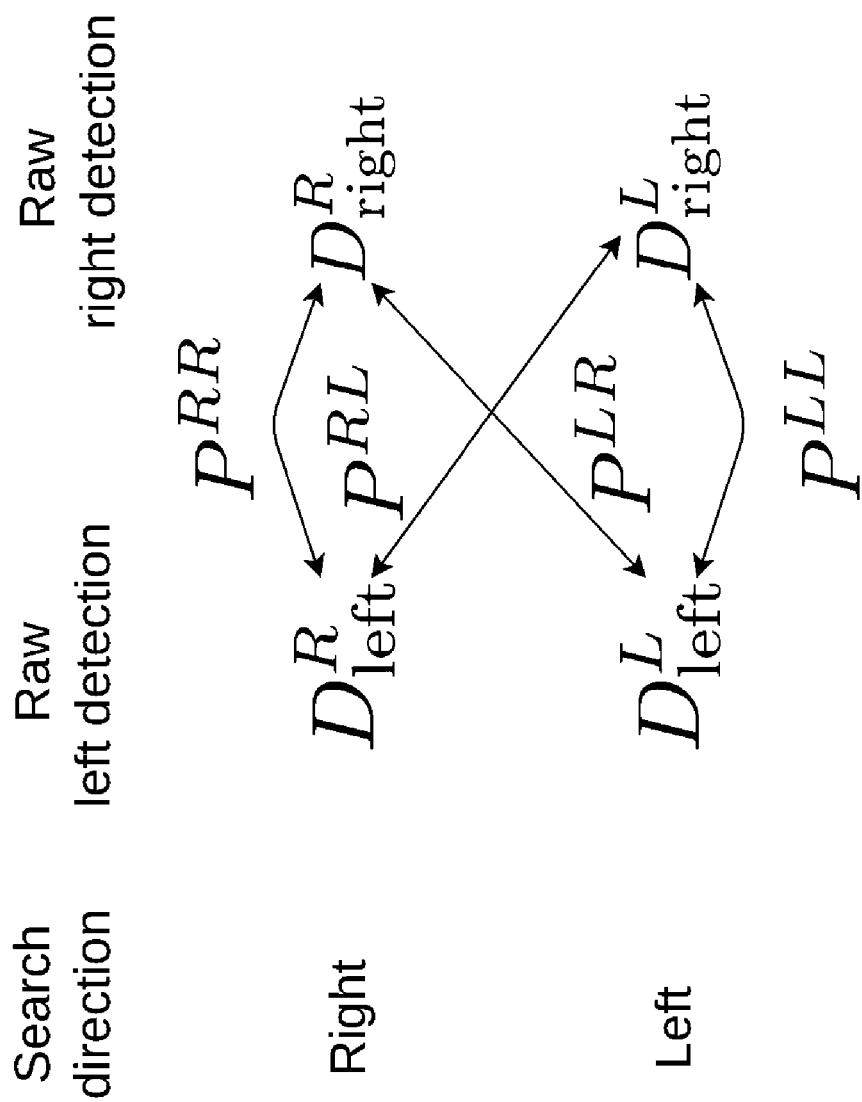
FIG. 2 is a diagram showing various correspondence mappings and their relations to the different kinds of raw detections in an embodiment.

This is illustrated in FIG. 2, which is an illustration of the various correspondence mappings in this embodiment, specifying which correspondence mapping is to be used for which raw detections.

In an embodiment the correspondence mapping data block is a binary mask (pairing mask) described by a tensor defined on the same 2D grid as the raw detections, telling which tensor coordinates produce detections corresponding to the physically same lane boundary. The binary refers to the number of classes represented by the pairing mask: it describes a two-element set, where one element is interpreted as background and the other as foreground. For example, a convenient choice for the binary mask values is {0,1}, but any other values or representation (e.g. a probabilistic, see below) can be chosen. In this example, the mask takes value zero at indices where $D_{left}$ and $D_{right}$ points to different physical lane boundaries and the value of the mask is one where they point to the same instance. The zeros of the mask are interpreted as background, that is, no pairs are detected from these indices (in other words, the respective raw detection tensor elements do not point to the same lane boundary). The ones are interpreted as foreground, because detection pairs are predicted from these indices.

Although in an embodiment the pairing mask takes discrete values in the annotation (ground truth), the network output can be chosen to be a real value, which is interpreted as a score describing how certain the network is about the point being a foreground in the sense of pair prediction (such an approach is illustrated in the examples below). In this case, a point is accepted as a foreground if the neural network output in the correspondence mapping exceeds a certain threshold.

In a probabilistic approach, the elements of the pairing mask are real numbers in a probability range (typically 0 to 1), describing the probability that $D_{left}$ and $D_{right}$ points to the same physical lane boundary. The foreground and background classes are recovered by a threshold selected from the probability range (it is typically higher than or equal to 0.5, e.g. it is selected to be 0.5 or 0.75), such that probabilities higher than the threshold are considered as foreground, and probabilities lower than the threshold are considered as background. With the help of this parameter the neural network can be fine-tuned on the precision-recall function. It is expected that a higher threshold gives smaller recall and higher precision for the foreground region. The raw probabilities before thresholding can be forwarded to the following modules and they can serve as a confidence in the detections.

The learning of the pairing mask can be considered either as a regression or as a classification problem. In a regression problem the prediction is a single real value on the 2D grid, which can be regressed e.g. by a simple $L_1$, $L_2$, etc. regression loss. In the classification approach the output is 2D vector defined on the 2D grid, whose first component (e.g. represented in a channel dimension) describes the probability of having a background and the second component corresponds to the foreground probability. Being dependent outputs, the correspondences are well-defined by either the foreground or the background probabilities. The classification approach is preferred in many cases (giving a normalized score on the top of the classification into foreground or background), but the regression approach can also be used. This can be assigned a traditional classification loss, e.g. the softmax loss, focal loss, etc. . . . . In an example we chose the classification approach with softmax loss.

The softmax loss looks like $$L = -\sum_{(i,j)} (p_{GT,fg} \log p_{pred,fg} + p_{GT,bg} \log p_{pred,bg}), \quad (9)$$

where the sum goes through all spatial indices of the 2D grid, $P_{GT,fg/bg}$ is the ground truth probability (usually binary) that the position is foreground/background for pair prediction, and $p_{pred,fg/bg}$ is the predicted value. The loss is minimized if the prediction equals to the ground truth value.

Accordingly, the raw detection preferably gives the distance of the closest lane boundary point—along the epipolar direction—from a respective coordinate grid point. A value is given in every tensor element of the raw detection tensors, since the foreground is not designated using a window size, but by the help of the correspondence mapping tensor. In this case, this tensor is a binary mask, which describes which raw detection values being on the same point of the coordinate grid correspond to the same lane boundary.

An example for a pairing mask and the raw detection tensors is given in Tables 1a-1c.

Based on the above, in this embodiment the correspondence mapping tensor is a pairing correspondence mapping tensor (this is the pairing mask), having in each of its third tensor elements a pairing probability value (the probability values below in the correspondence mapping data are pairing probability values) characterizing—i.e. corresponding to—the probability of that the closest first lane boundary point and the closest second lane boundary point correspond to the same lane boundary (i.e. the lane boundaries on the first and second image—points of which is under investigation—correspond to the same lane boundary, in other words, it is determined based on the images that the same lane boundary can be observed in the first and second images) and are positioned within a window size from the coordinate grid (from which the distance values are also measured) tensor element corresponding to the respective third tensor element, and the third tensor elements with respective probability values being above a predetermined first threshold are selected as foreground third tensor elements (see the details of foreground designation at the embodiments; the embodiment with binary pairing mask is also considered to be such embodiment, see the next section), which foreground third tensor elements and the corresponding first tensor elements and second tensor elements are used in the pairing step (in the pairing module) as the output data of the image processing step (of the image processing module), i.e. are maintained for further calculations (see also the examples illustrated by tables; the foreground is selected for further calculations, other values of the tensors are not taken into account).

The optimal value of the window size depends on the resolution of the input images, typically between 1 pixel and half of the image width in pixels. Preferably, it is chosen to be smaller than half of the typical lane width (lateral distance between neighboring lane boundary lines) seen at the bottom of the image; which depends on the camera calibration.

The above mentioned pairing probability values are thus high in case the same boundary line can be found both in first and second images within a window size from a respective coordinate grid. The value of a distance given in a raw detection tensor is thus maximized by the window size (see also expressions (7) and (8) above).

Examples for the pairing correspondence mapping tensor are shown in Tables 1a and 4a-4c (in the examples these are simply labelled as 'correspondence mapping').

The 'pairing' attribute in the name has the only purpose to identify the approach, the tensor could be named also in a different way.

Figure 3A:
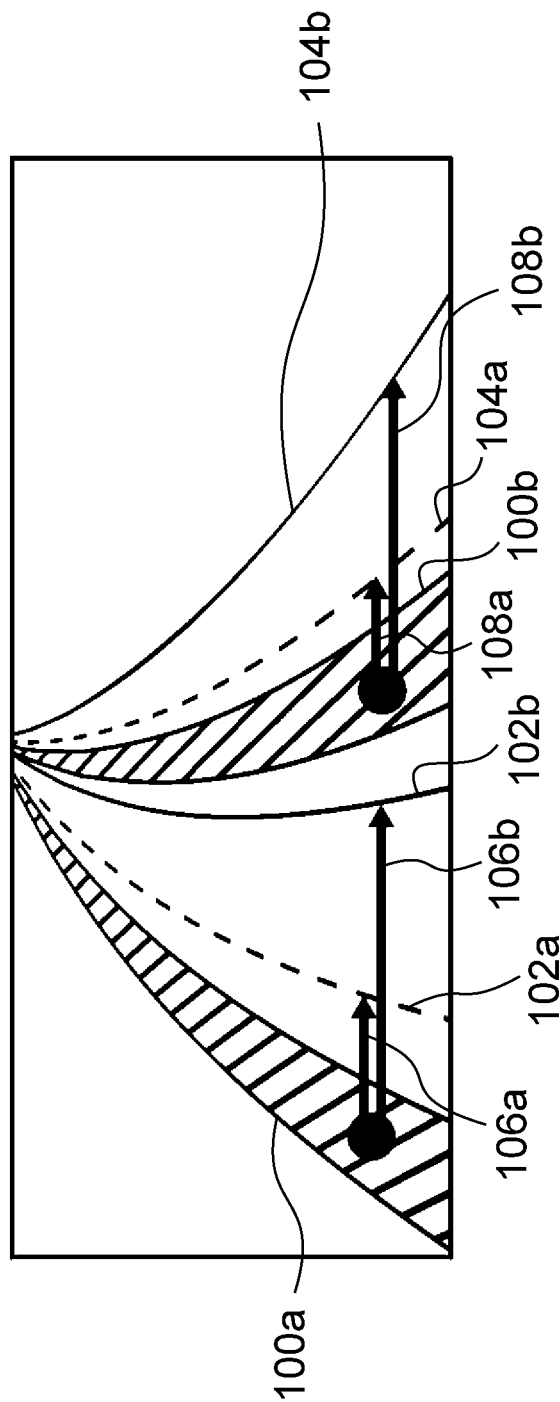
FIGS. 3A-3C are schematic drawings showing the unification of exemplary left and right images in an embodiment, with illustrating various paring masks and searching directions.
Figure 3B:
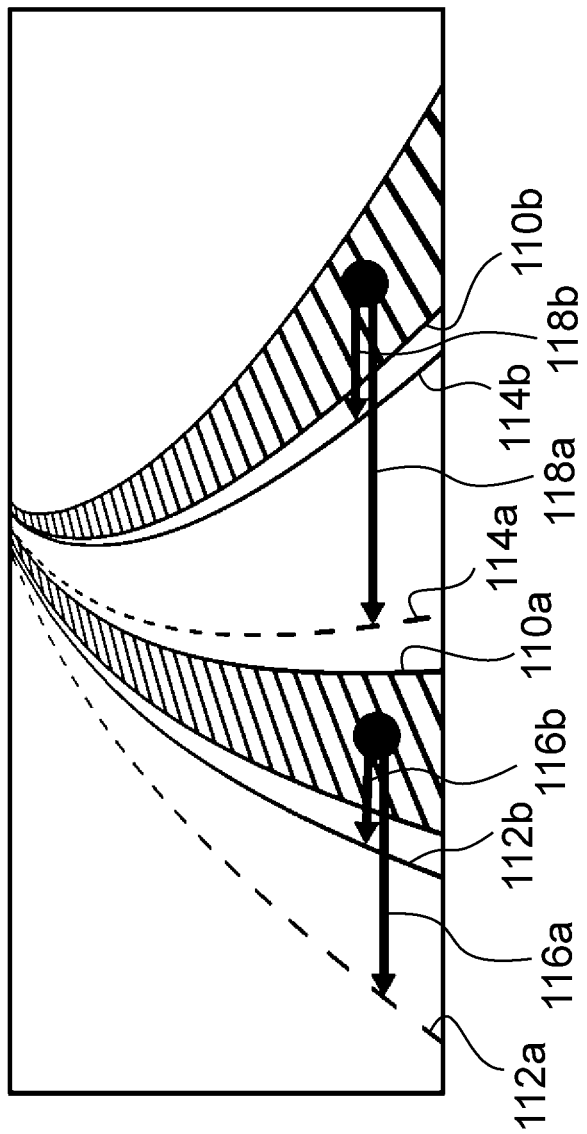
Figure 3C:
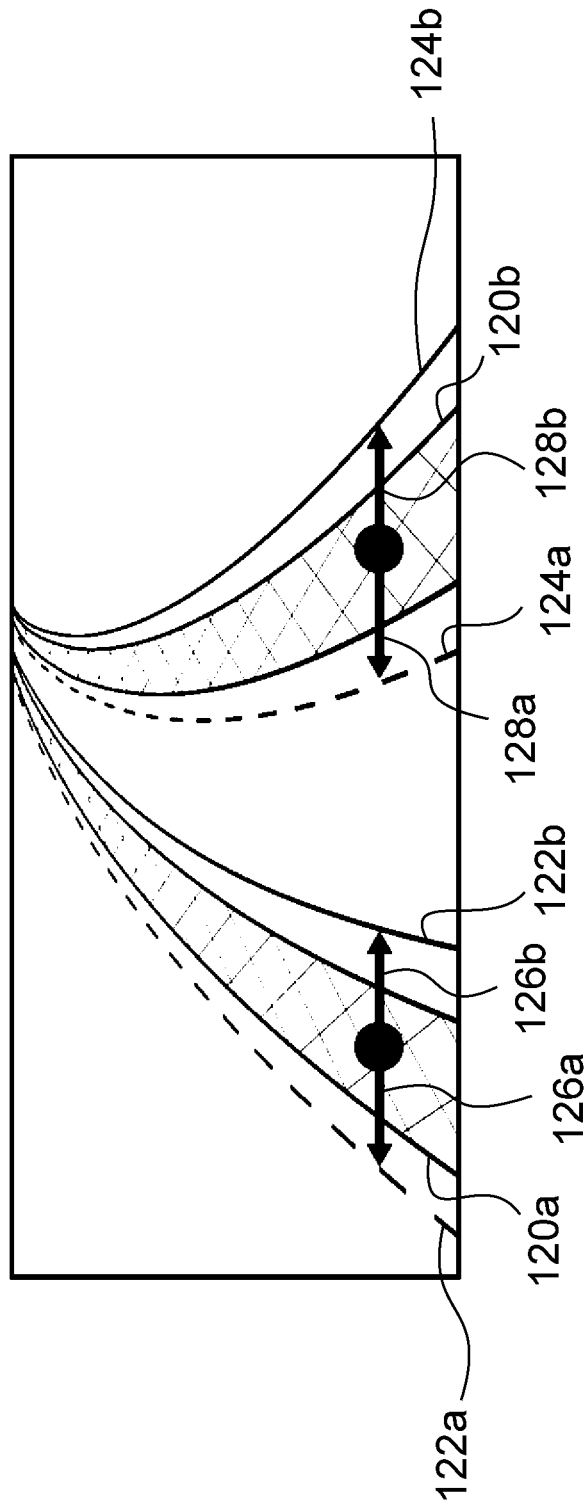

The RR, LL and RL types of foreground regions of pairing masks described above have a transparent visual interpretation, which is interpreted in connection with FIGS. 3A-3C. In FIGS. 3A-3C the lanes from the left and right image are observable on the same figure. This type of figure comes from the unification of these images. The foreground region of the pairing mask is designated in the unified figure. The two images which give the starting point (first and second images) has the same size, i.e. a frame of a same size corresponds to them. In this frame, both images, in particular the lane boundaries can be shown, and, since the images are loaded to the same frame, the content of the original images is shifted a bit compared to each other. The lane boundaries can be described by different parameters in the first and second image. According to the invention, the coordinates of the lane boundaries can be derived not in the two dimensions of an image but also the depth-coordinate can be determined.

The correspondence map may also be interpreted in the above defined frame. It preferably gives a respective value for every grid point according to its definition, i.e. taking into account e.g. the searching directions and the window in an embodiment. In the stereo instance segmentation embodiment, the correspondence information is defined by the help of labels; other ways of representing the correspondence information are given below.

Accordingly, e.g. in the example of FIG. 3B it would be closer to the lane boundary on the left image (continuous line) than to the lane boundary on the right image (dashed line).

FIG. 3A shows the foreground regions 100a, 100b corresponding to an RR type pairing mask (each for a pair of lane boundaries from the first and the second image) are regions on the 2D grid, from which the closest lane boundary to the right on both left and right images correspond to the same real, 3D lane boundary (the centers of the lane boundaries are shown in the figures as lane boundary projections which are the projections of 3D lane boundary to the first and the second image, see below).

Accordingly, in FIG. 3A lane boundary projections 102a and 104a (shown by dashed lines; in case of the lane boundaries the line on the figures corresponds preferably to a centerline of a finite width lane boundary marker, and it is irrelevant in the visualization whether the original lane boundary is dashed—e.g. with long breaks—, continuous or other type) correspond to a lane boundary on the right (second) image, and lane boundary projections 102b and 104b (shown by continuous lines; the other lane boundary projections 102a, 104a are also continuous, but shown dashed to differentiate from the continuous illustration) correspond to a lane boundary on the left (first) image. From these lines, the lane boundary projections 102a and 102b correspond to the same lane boundary (dashing and continuousness correspond not to the type of the lane boundary, but these visualize the same lane boundary); both of these lane boundary projections 102a, 102b are on the right of the foreground region 100a (the same holds for lane boundary projections 104a, 104b and foreground region 100b).

In FIG. 3A, also distances 106a and 106b, as well as distances 108a and 108b can be observed. These distances 106a, 106b, 108a, 108b are pointed from a point of the foreground regions 100a, 100b; this starting point corresponds to a point of the coordinate grid. The end points of the distances are on the lane boundaries observable on the left and the right image, respectively. Thus, distance 106a gives a $D^R_{right}$ raw detection value, and distance 106b gives a $D^R_{left}$ value. As shown in FIG. 3A, in case of more lane boundaries being visible in the camera, more foreground regions of the paring masks and more distances can be designated. The distance between the boundary of the foreground regions 100a, 100b and the lane boundary projection being closer from the two projections has to be smaller than the resolution of the grid (i.e. the distance between the grid points). However, in FIGS. 3A-3C—for illustration reasons—a gap is shown between this lane boundary projection and the foreground region. It is noted that—on the top of the maximum distance—a minimum value for the distance could also be defined.

Other type foreground regions 110a, 110b are observable in FIG. 3B. In this case, the LL type mask is illustrated to which a region is assignable from which the nearest lane boundary to the left corresponds to the same physical lane boundary on both the left and right images. In this case lane boundary projections 112a and 114a (marked with dashed lines) correspond to lane boundaries on the right image, and their pairs, lane boundary projections 112b and 114b (continuous lines) are observable in the left image. These are different lane boundaries than those of FIG. 3A, and the pairs are clearly on the left side of the foreground regions 110a, 110b of the pairing mask. As illustrated by the multiple foreground regions 110a, 110b, only the lane boundaries corresponding to a pair have to be on the left side of the respective foreground region 110a, 110b. Other reference signs of this figure are similar to FIG. 3A, i.e. distances 116a and 116b pointing to the respective lanes of a pair from a point of the coordinate grid. The distances 116a and 118a correspond to $D^L_{right}$, while the distances 116b and 118b correspond to $D^L_{left}$.

Third type of foreground regions 120a and 120b of a pairing mask are observable in FIG. 3C. The foreground regions 120a, 120b of the RL type pairing mask are the region from which the nearest lane boundary to the right on the left image corresponds to the nearest lane boundary to the left on the right image. This region looks like a slice (a set of slices) bounded by lanes on the left and right images.

According to the search directions, distances 126a and 126b ($D^L_{right}$ and $D^R_{left}$), as well as distances 128a and 128b point in different (opposite) direction in FIG. 3C. As shown in FIG. 3C, the foreground regions 120a and 120b are designated between respective pairs of lane boundaries. Thus, the foreground region 120a is between a lane boundary projection 122a (dashed line, lane boundary on right image) and a lane boundary projection 122b (continuous line, the same lane boundary on left image), and the foreground region 120b is between a lane boundary projection 124a (dashed line, a further lane boundary on right image) and a lane boundary projection 124b (continuous line, the pair of the further lane boundary on left image).

The structure of the foreground region of the LR type mask is similar to the RL type mask. LR type mask is the region from which the nearest lane boundary to the left on the left image corresponds to the nearest lane boundary to the right on the right image. This is an empty mask if the principal points of the cameras equal, or $c_{x,left}-c_{x,right}>=0$. This is the same as $c_{x,left}>=c_{x,right}$; in this case the disparity is equal or larger than zero, i.e. in the right camera all of the objects are more on the left than in the left camera. Thus, there is no LR region, more precisely, it is an empty mask. In addition, a restriction for the maximal distance to either of the lanes can be added to the pairing mask, such that pairs are only predicted from regions close to the lanes, and not from areas far away from the lane markers (e.g. vegetation, buildings, etc.). If the neural network does not predict foreground regions for the raw detections, this maximal distance should be chosen according to the window size applied in training the raw detections.

The foreground regions of the RR, LL and RL type masks are illustrated not only in FIG. 3, but also in FIG. 4. FIGS. 3 and 4 shows the case $c_{x,left}=c_{x,right}$, which is the standard choice in rectification. Increasing the value of $c_{x,left}$ shifts the projections of the lane boundaries on the left image to the right. Consequently, the distance between the left and right projections of the lane boundaries increases, and e.g. the RL type foreground mask becomes wider. The minimum disparity seen on the image is greater or equal to $c_{x,left}-c_{x,right}$. Decreasing the value of $c_{x,left}$ shifts the projections of the lane boundaries on the left image to the right. Consequently, the distance between the left and right projections of the lane boundaries decreases, and e.g. the RL type foreground mask becomes narrower. Additionally, in the far region, where the right projection of the lane boundary is to the right of the left projection of the same lane boundary (which never happens if $c_{x,left}>=c_{x,right}$), an LR type foreground mask emerges. Similarly, increasing or decreasing $c_{x,right}$ shifts the projections of the lane boundaries on the right image to the right or left, respectively.

FIG. 4A-4F give an illustration of foreground region of the RL, RR, LL type pairing masks (highlighted by white strips) on realistic images with $c_{x,left}=c_{x,right}$. In a row, the same region is highlighted on the left and right images, corresponding to the foreground regions of the pairing masks. It can be observed that the positioning of the paring mask is absolute, i.e. same on the two picture, while the contents of the pictures are different according to that the picture has been taken by the left or right camera (see e.g. the car being in the next lane, as well as the lane boundary sections observable in front of the picture taking car).

Figure 4A:
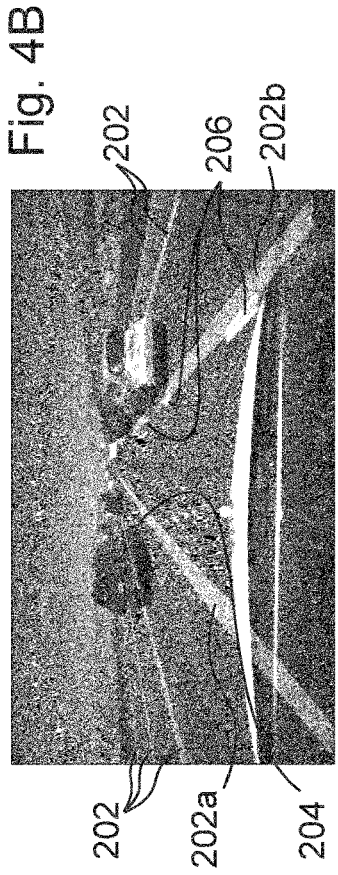
FIGS. 4A-4F are schematized exemplary left and right images showing pairing masks and lane boundaries in a similar embodiment as of FIGS. 3A-3C.
Figure 4B:
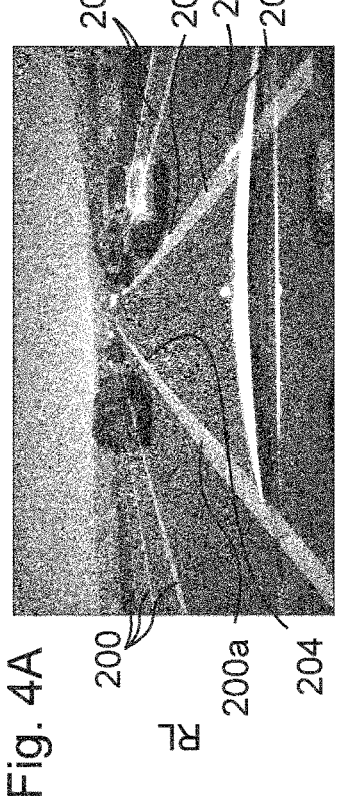

In FIGS. 4A and 4B, the foreground of the RL mask lies between left and right projection of the same 3D lane boundary line (left and right projections mean the visualization of the lane boundary on the left and the right image being the projections of the same real 3D boundary marker). Consequently, the shape of the pairing mask is constrained by the lane boundary markers run on its left and right side (cf. with FIGS. 4C-4F). In FIGS. 4A and 4B foreground regions 202a and 202b of the RL mask are those which correspond to lane markers 204 and 206 (not too much of the lane markers are visible on FIGS. 4A and 4B, see also FIGS. 4C-4F for the same lane boundary markers 204 and 206) which are boundaries of the lane in which the image taking car proceeds. Other foreground regions 200 of the RL mask are shown in FIGS. 4A and 4B, illustrating that preferably all lane boundaries being in front of the image taking car are identified by the method according to the invention (also occluded parts of the foreground 200 are identified).

The foreground region 200a, 200b and 200 of the pairing mask—in particular at large distances from the car making the images—is narrower in FIGS. 4A and 4B than in FIGS. 4C-4F (see their reference signs below). This is because the disparity limits the width of the foreground of the RL mask. However, the widths of the foreground region of RR and LL masks are limited by the distance of the lane boundaries. Moreover, all foreground region width is limited also by the window size.

As another consequence, the pairing mask is very close to the lane boundary markers. In this example, the foreground region is exactly the region between the two projections of a lane boundary marker (from left and right images, this and other interpretations could also be used for general first and second image also), i.e. the foreground regions are approximately limited by the central lines of the lane boundary markers (for a good illustration, see that lane boundary marker 206 in FIG. 4B, which is close to the car). Approximately limited is meant that a foreground region starts at a grid point being closest to the central line of the lane boundary marker, so it is unobservable close to the central line (from this point of view, FIGS. 3A-3C use a schematic illustration to allow to distinguish between the foreground regions and the lane boundary projections).

Figure 4C:
Figure 4D:

In FIGS. 4C and 4D it is observable that foreground regions 208a, 208b and 208, 210a, 210b and 210 (same approach for foreground regions 208a, 208b, 210a and 210b as above for foreground region 200a and 200b, regions with reference number 'a' and 'b' are those which surround the image taking car) of the RR mask lay left to both respective left and right lane boundary markers 204 and 206 (mostly observable for the central lane occupied by the image taking car). The foreground of the pairing mask is closer to the lane boundary on the right image than in the left image according to the viewpoints of the cameras corresponding to the left and right image (cf. also with FIG. 3A).

Figure 4E:
Figure 4F:

In FIGS. 4E and 4F foreground regions 212a, 212b and 212, 214a, 214b and 214 of the LL mask lie right to both the left and right projections. The foreground of the pairing mask lies closer to the lane boundaries on the left image than in the right image.

Figure 4G:
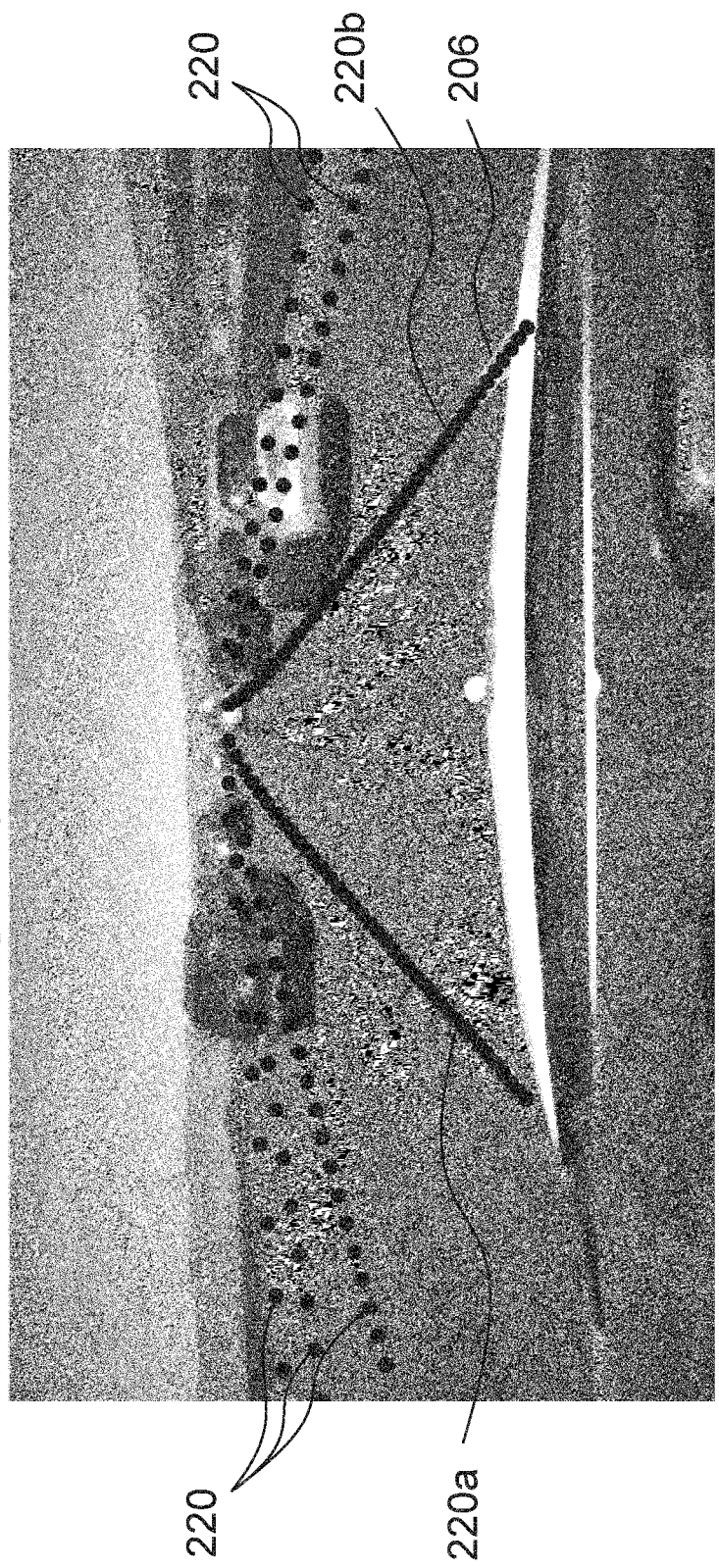
FIG. 4G shows the left image space detections corresponding to the scheme of FIGS. 4A-4F, FIGS. 5A and 5B are Y(Z) and X(Z) diagrams for the results obtained based on the scenario shown in FIGS. 4A-4G by the help of an embodiment of the method according to the invention.

FIG. 4G shows—as an example—the left image space detections averaged from the three foreground regions RL, RR and LL, corresponding to the results given in FIGS. 4A-4F. It is observable in FIG. 4G that good detections (dense and near the centerline drawn by the lane markers) 220a and 220b for the lane occupied by the image taking car; detections 220 for every other lane boundaries are also good results, and also occlusions are resolved.

Figure 5A:
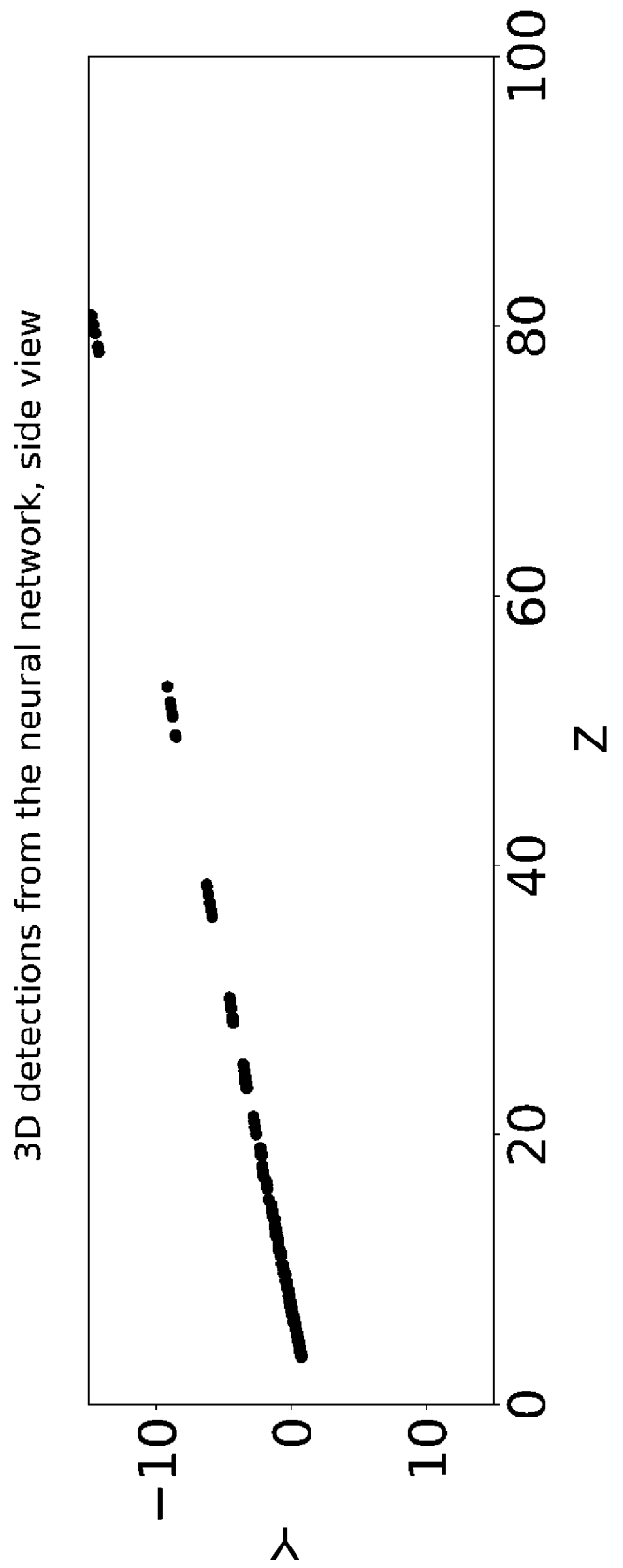
Figure 5B:
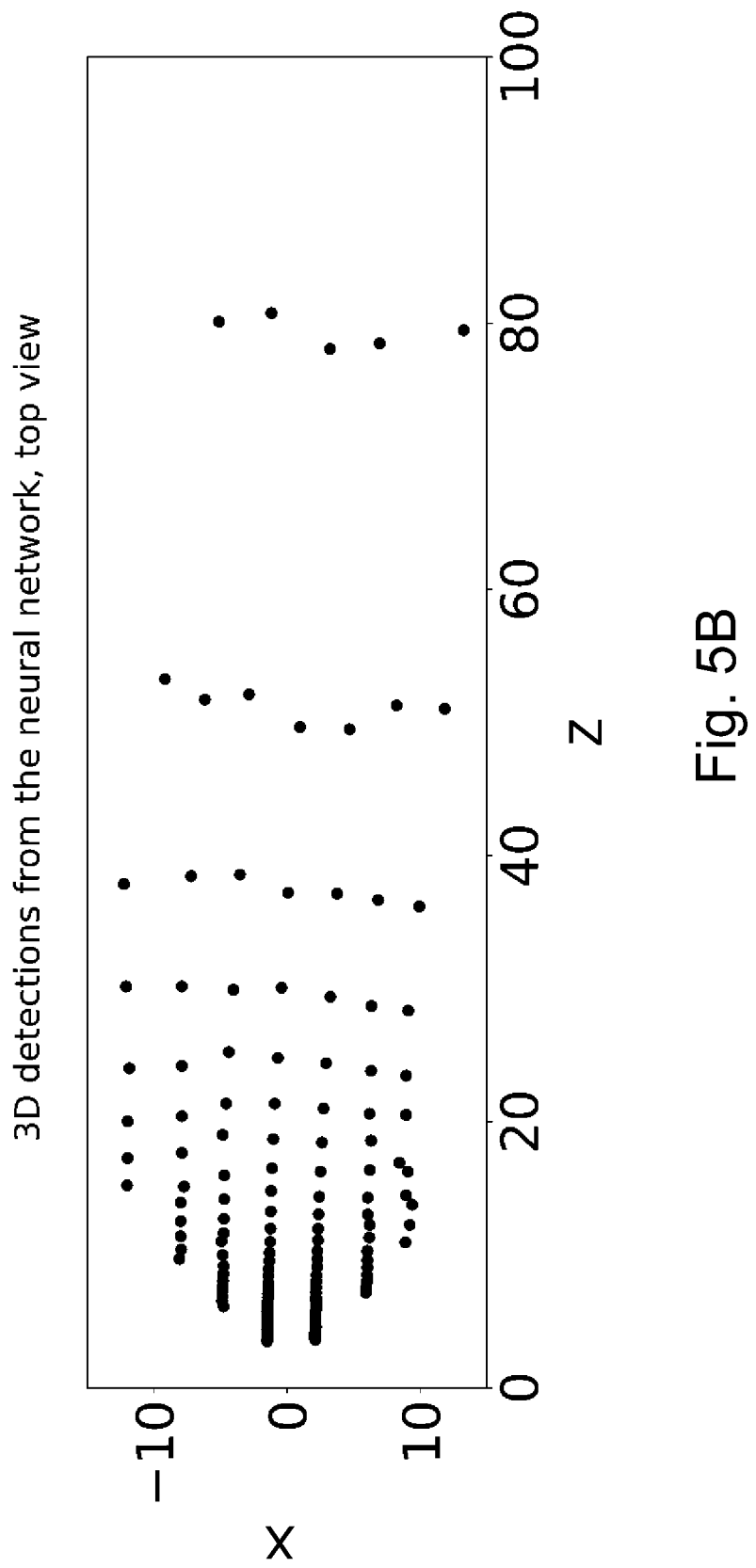

In FIGS. 5A and 5B graphs corresponding to the function Y(Z) (side view) and X(Z) (top view) showing the 3D lane detection data obtained from the results illustrated on FIGS. 4A-4G are shown. It is clear from the results of FIGS. 5A and 5B that good quality results can be obtained by the respective embodiment of the invention. The results shown in FIG. 5A illustrate a slowly ascending road in the camera coordinate system, which is due to the pitch angle of the camera, and in FIG. 5B illustrate approximately parallel lanes. The lane boundary corresponding to the lane markers 204 and 206 correspond to the points in the interval X in [−4 meters, 4 meters] in FIG. 5B. The optical axis of the camera is preferably not parallel with the road surface (it is fixed by the desired coverage of the environment with the camera). The invention is, therefore, preferably suitable for online calibration of pitch and roll angle of the camera. Accordingly, in the invention the pitch and roll movements of the vehicle can be compensated.

In FIGS. 5A and 5B, the detections are organized in an approximately quantized pattern (there are larger and larger gaps between detections at further distances) due to the perspective distortion.

Figure 6A:
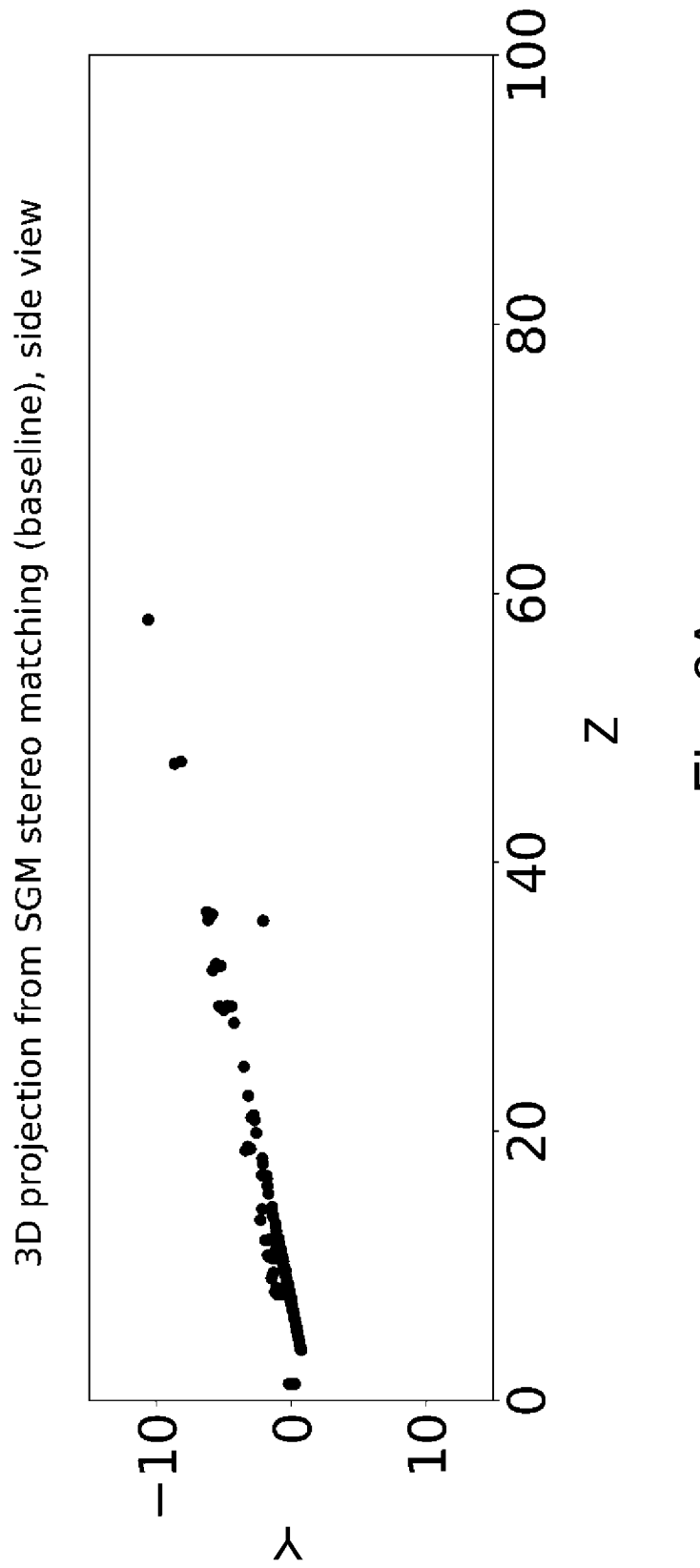
FIGS. 6A and 6B are Y(Z) and X(Z) diagrams for the results obtained based on the scenario shown in FIGS. 4A-4G by the help of a known approach.
Figure 6B:
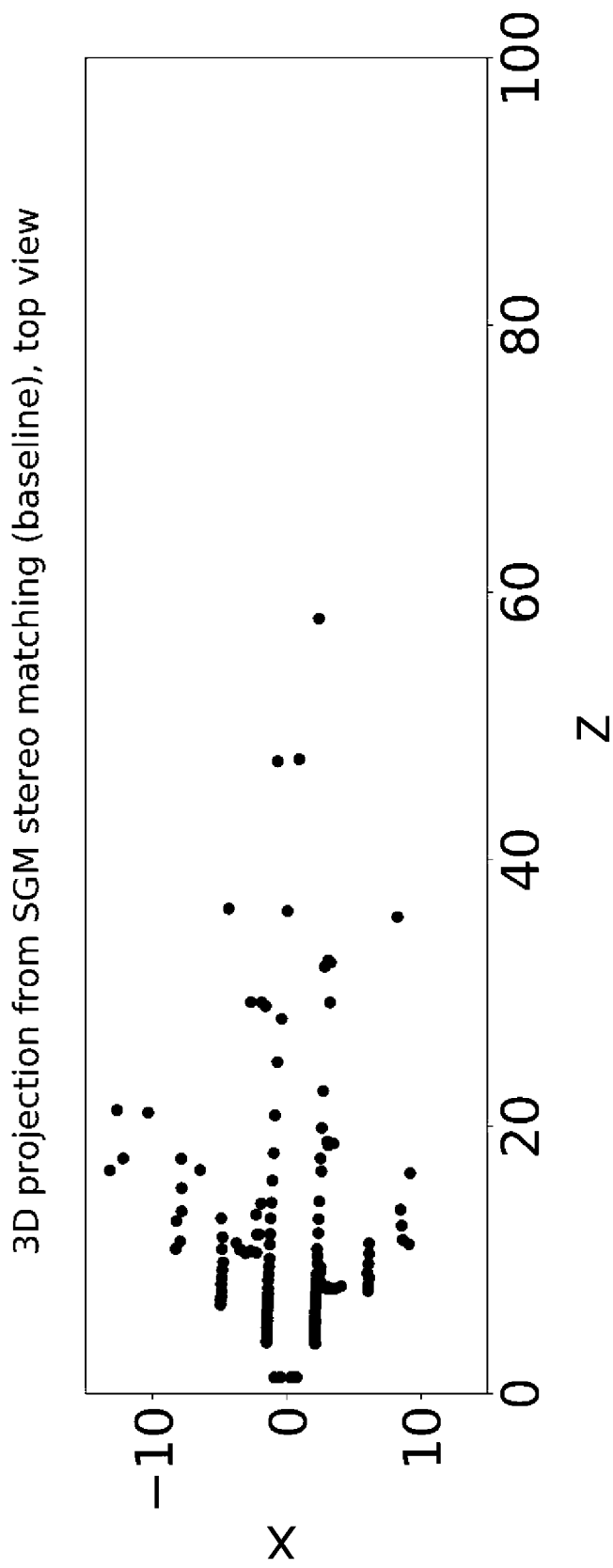

The good quality of results even more supported by FIGS. 6A and 6B which are the results of 3D projection from SGM (Semi-Global Matching, a widespread stereo matching algorithm, Hirschmuller, Heiko. "Accurate and efficient stereo processing by semi-global matching and mutual information." 2005 IEEE Computer Society Conference on Computer Vision and Pattern Recognition (CVPR'05)) for Y(Z) and X(Z). For a fair comparison, the left image space detections of FIG. 4G are used, only the disparity estimated from the invention is substituted by the result of the SGM algorithm in Eqs. (3-4) to evaluate the 3D position of the lane boundaries. FIGS. 6A and 6B show a lot of noise (there are many outlier points), i.e. the results of FIGS. 5A and 5B are much better. The lane boundaries in occluded regions are projected to a false position in the camera coordinate system using SGM disparity, and the range of valid detections is much shorter (20-40 m in FIG. 6B) compared to the invention (60-80 m in FIG. 5B).

The lane boundaries running behind the car correspond to the next lane—and hidden by a car during it is in a hiding position—are also illustrated, since the hidden part of the lane boundaries can be resolved by the method and system according to the invention.

Resolving of the occlusion (the lane boundary runs e.g. behind a car) is based on the ground truth and the learning process of the neural network (in general, the image processing module trained by machine learning). Such ground truth which can help by recognizing the occlusion can be obtained from several sources: from maps, previous or following frames without occlusion, simulated images, etc. (in a ground truth the foreground region is shown also behind a car).

In a further embodiment the correspondence mapping is a mask taking discrete values from a set of size C, which is indexed by k=0 . . . C−1. E.g. the mask is considered as background represented by e.g. k=0 at indices where $D_{left}$ and $D_{right}$ points to different physical lane boundaries, and it takes value k (k=1 . . . C−1) if both $D_{left}$ and $D_{right}$ points to the same lane boundary with property indexed by k. For instance, this property may be the instance label of the lane or it may distinguish between dashed and solid lines, etc. The non-background indices are considered as the foreground. The correspondence mapping output of the neural network is a 2D grid of C dimensional vectors, that is, the output has C components (channels) at each position of the 2D grid. The first channel may refer to the background probability, and the other C−1 channels may describe the probability of a foreground region with property indexed by k=1 . . . C−1.

If the lane property represented by the pairing mask can be formulated as a classification problem, as in lane type classification, which describes the dashedness and/or color of the lane separator, the training can be driven by a softmax loss with C categories, similar to Eq. (9).

$$L = -\sum_{(i,j)} \sum_{k=0}^{C-1} (p_{GT,k} \log p_{pred,k}) \quad (9b)$$

If the lane property represented by the pairing mask is the lane instance label, then the loss function can be one of those used in instance segmentation tasks. The difference between classification and instance segmentation is that in instance segmentation a permutation of the ground truth labels may be considered as a similarly good output (the labels are equivalent), which should be respected by the loss function. A more detailed description about instance segmentation is given below.

The details of the pairing module in an embodiment are given below. The image position of the detections in the original image depends on the coordinate grid and on the raw detection tensor D (generally, this is a data block, but it is a tensor in this embodiment; the raw detection data preferably comprises values usable in the framework of the original image, these are not affected by the down/upsampling of the neural network; the neural network could also implement if the scaling would applied also in the prediction, since it is a multiplication with a constant this detail in connection with the approach to the scaling does not cause relevant difference in the efficiency). As discussed previously, detections are only accepted from foreground regions. The pairing module has two tasks: to produce image space representation of left and right detections, and to pair them according to the correspondence mapping.

In this embodiment, not just the pairing, but also the foreground region is represented by the correspondence mapping P (in another embodiment the foreground region is part of the raw detection tensor).

The image space detections are calculated by adding the raw detection tensor D to the horizontal component of the coordinate grid. (Or if the raw detection tensor has vertical component as well, then that should be also added to the vertical component of the coordinate grid).

$$\text{Detection}_{i,j}=(u_{i,j}+D_{i,j}, v_{i,j}) \quad (10)$$

Accordingly, the first component of the $\text{Detection}_{i,j}$ is equal to $u_{i,j}+D_{i,j}$, and the second component is $v_{i,j}$. The definition of the coordinate grid $(u_{i,j}, v_{i,j})$ is given in the raw detections section, an example for the grid is given in Table 2.

The image space detection tensor may be calculated for all indices, but only detections coming from foreground regions will be accepted. Alternatively, the image space detections may be only calculated at indices corresponding to the foreground region of the pairing mask.

The left and right image space detections originating from the same foreground index (i,j) of a pairing mask are pairs, which can be further processed by the disparity module and the 3D projection module.

If the neural network produces multiple correspondence mappings of type RR, RL, etc., the pairing module outputs image space detection pairs corresponding to all types RR, RL, etc. Optionally, the image space detections coming from the various pairing masks can be averaged in the pairing module if they represent the same 3D lane boundary point, or they can be forwarded as independent detections.

In this embodiment the representation loss introduced for the raw detections is equivalent to an image space loss, and it is not necessary to introduce an additional image space loss at the pairing module. Alternatively, one can use only the image space loss in the pairing module and turn off the representation loss for the raw detections. There is a slight difference between the two approaches in how the foreground regions are handled in the loss computation. In the image space loss introduced in the pairing module, the natural choice is to sum over indices that are considered as foreground in the pairing mask. In the representation loss introduced for the raw detections, the foreground only depends on the lane boundary on a single image, so loss might be assigned to regions which are eventually not used in pair prediction.

The details of the disparity module are specified herebelow as a continuation of the above introduced embodiment. The disparity tensor is calculated as the difference between horizontal components the left and right image space detection tensors.

$$\text{Disparity}_{i,j}=u_{\text{left detection},i,j}-u_{\text{right detection},i,j} \quad (11)$$

Note that in this embodiment, the same result is obtained by directly subtracting the raw detection tensors $D_{left}-D_{right}$. Disparity is calculated for all detection pairs coming from the various types of pairing masks, and the resulting disparity value is obtained by averaging or the disparity values are treated separately.

A similar loss function can be used as for the raw detections. Disparity loss is assigned only to the foreground indices of the relevant pairing mask.

In the 3D projection module, the 3D projection is done according to Eqs. (3-4) above for all detection pairs.

For example, a Huber loss function can be used for the 3D projections, however, any suitable loss function could be applied.

$$L_{3D} = \Sigma f(|r_{pred} - r_{GT}|), \quad (12)$$

where r (bold 'r') is the 3D vector pointing to the predicted or ground truth position of the lane boundary, $$f(x) = \begin{cases} x^2 & \text{if } x < x_0 \\ 2x_0 x - x_0^2 & \text{if } x \geq x_0 \end{cases} \quad (13)$$

and $x_0$ is an arbitrary threshold, and the sum goes through the detections corresponding to the ground truth pairing mask. 3D projection loss is assigned only to the foreground indices of the relevant pairing mask.

The tables below illustrate for highly simplified examples the tensors and calculations appearing in the various modules of the system according to the invention. For simplicity, in the tables below, values are provided only for a single left and right detection tensor $D^R_{left}$ and $D^L_{right}$, for which the correspondence mapping is given by $P^{RL}$. The coordinate grid in this example is defined by $stride_x = stride_y = 8$, $offset_x = offset_y = 4$. Considering also Table 2a below, it can be observed that these parameters mean that in the neighboring grid points, the x or y coordinate jumps with eight. According to the offset values, the coordinate grid starts with (4,4), not with (0,0); this is a more practical choice for starting point. The camera parameters are $c_x = 30$, $c_y = 3$ for the principal point, $f = 200$ for the focal length, $B = 1$ for the distance between the two cameras.

Tables 1a-1c illustrate the raw outputs of the neural network, that is the correspondence mapping and the left and right image raw detection tensors. This information is the output of the trained neural network. After that, Table 2 (more precisely, Tables 2a, 2b and 2c) demonstrates the tensors and calculations appearing in the pairing module, and Table 3 (Tables 3a, 3b and 3c) demonstrates the output of the disparity module and the 3D projection module.

TABLE 1a

| Correspondence mapping ($P^{RL}$) | | | |
|---|---|---|---|
| 0.11 | 0.22 | 0.95 | 0.03 |
| 0.07 | 0.99 | 0.05 | 0.02 |
| 1.0 | 0.01 | 0.08 | 0.07 |
| 0.02 | 0.08 | 0.06 | 0.00 |

TABLE 1b

| Left image raw detections ($D^R_{left}$) | | | |
|---|---|---|---|
| x | x | 2.0 | x |
| x | 3.4 | x | x |
| 1.1 | x | x | x |
| x | x | x | x |

TABLE 1c

| Right image raw detections ($D^L_{right}$) | | | |
|---|---|---|---|
| x | x | −0.1 | x |
| x | −5.8 | x | x |

TABLE 1c-continued

| Right image raw detections ($D^L_{right}$) | | | |
|---|---|---|---|
| −15.0 | x | x | x |
| x | x | x | x |

The raw outputs of the neural network are given in the above Tables 1a-1c. Table 1a shows a correspondence mapping data block which has the form of a tensor (more particularly, a matrix) in the present embodiment. All data blocks in this embodiment has tensor (matrix) form.

The correspondence mapping tensor given in Table 1a corresponds to the foreground channel of an RL type pairing mask. The background channel is not illustrated as it does not contain extra information (the foreground and background probabilities add up to 1). The RL mask describes correspondences between $D^R_{left}$ and $D^L_{right}$, consequently, these raw detections are given in Tables 1b and 1c.

In Table 1a, the foreground region of the pairing mask, where the output exceeds a threshold (e.g. 0.5), is highlighted by bold letters. In this case the left image raw detections take positive and the right image raw detections take negative values, corresponding to the R and L search directions (see FIG. 3C which shows that $D^R_{left}$ pointing right from the foreground region has thus positive values, and $D^L_{right}$ having opposite direction has negative values; accordingly, these distances are signed).

Lowercase x in Table 1b and 1c denotes values predicted by the network but ignored because of the invalid correspondence, only those values are maintained to which threshold-exceeding probability values correspond in Table 1a (for more details about the predetermined threshold, see other parts of this description). In other words, the illustrated left or right image raw detections above shows only those values which were selected as foreground, i.e. not the "original" raw detections (which are preferably the outputs of the image processing module) but those which have been filtered by the correspondence mapping.

Tables 1b and 1c shows that in this example, three pairs remain after this filtering.

In the raw outputs naturally, down-/upsampling is applied compared to the original left and right images. Consequently, in the example a lane boundary is detected which goes according to the valid values of Tables 1b and 1c.

TABLE 2a

| Coordinate grid (u, v) | | | |
|---|---|---|---|
| (4, 4) | (12, 4) | (20, 4) | (28, 4) |
| (4, 12) | (12, 12) | (20, 12) | (28, 12) |
| (4, 20) | (12, 20) | (20, 20) | (28, 20) |
| (4, 28) | (12, 28) | (20, 28) | (28, 28) |

TABLE 2b

| Left image space detection (u, v) | | | |
|---|---|---|---|
| x | x | (22.0, 4.0) | x |
| x | (15.4, 12.0) | x | x |
| (5.1, 20.0) | x | x | x |
| x | x | x | x |

TABLE 2c

| Right image space detection (u, v) | | | |
|---|---|---|---|
| x | x | (19.9, 4.0) | x |
| x | (6.2, 12.0) | x | x |
| (−11.0, 20.0) | x | x | x |
| x | x | x | x |

Tables 2a-2c gives illustration of the calculations done in the pairing module for the inputs obtained from Tables 1a-1c (stride is 8 and offset is 4 in both directions). The coordinate grid is calculated based on Eq. (5); the values show the strides and offsets applied. Detection pairs predicted from the foreground indices are indicated by bold letters (the same positions as in the correspondence mapping in Table 1a). The pairing module calculates the image position of the detection pairs by adding the left and right image raw detection tensors from Tables 1b and 1c to the coordinate grid according to Eq. (10) (accordingly, only the x coordinate of the coordinate grid is varied to obtain the image space detections). Depending on the embodiment, the image position of detections is calculated only for the foreground region (as in this example), or everywhere, but only valid pairs will contribute to the final output.

TABLE 3a

| Disparity | | | |
|---|---|---|---|
| x | x | 2.1 | x |
| x | 9.2 | x | x |
| 16.1 | x | x | x |
| x | x | x | x |

As illustrated in Table 3a, the disparity module calculates the horizontal distance between the left and right detections by the subtracting of the two corresponding tensors from Tables 2b and 2c, according to Eq. (11). In this embodiment, the disparity values can also be calculated based on the values of Tables 1b and 1c. The disparity values in Table 3a show—as it is natural in an image taken from a vehicle—that those point is the closest which is closer to the lower part of the image (i.e. to the bottom of the table), and lane boundary tends to be in higher distances at upper parts of the image (according to the lowest disparity 2.1).

TABLE 3b

| 3D projection | | | |
|---|---|---|---|
| x | x | (−3.8, 0.5, 95.2) | x |
| x | (−1.6, 1.0, 21.7) | x | x |
| (−1.5, 1.1, 12.4) | x | x | x |
| x | x | x | x |

As illustrated in Table 3b, the 3D projection module maps the detection pairs to the 3D space of the camera coordinate system from the left image coordinate of the detections and the disparity according to Eqs. (3-4), with $c_x=30$, $c_y=3$, $f=200$, $B=1$. Lowercase x denotes values predicted by the network but ignored because of the invalid correspondence. The values of Table 3b strengthen what was written in connection with the disparity values at Table 3a. The Z-coordinate (depth) grows higher and higher from the point closest to the bottom of the table (namely, from 12.4 to 95.2).

Herebelow, a similar example with lane type segmentation incorporated in the pairing mask is described. In this simple example we distinguish between solid and dashed lanes, but similarly more types can be included (e.g. dashed separators with various frequency, lane marker color, road side, etc.). For road side see also above where some aspect of this special type lane boundary is discussed.

In this example we consider only the RR type pairing mask, but it works similarly with all types of pairings. The calculations done in Tables 6-7 (Tables 6a-6c, Tables 7a-7c) are the same as in Tables 2-3 (Tables 2a-2c, Tables 3a-3b), but for the detection pairs lane type information is also provided. In contrast to the previous example, here a slightly larger window size is applied (the window size may depend on the distance—e.g. decreases at larger distances—, but it is sufficient to use fixed window size for the whole image), such that the foreground region is wider, and position of the same lane boundary point may be predicted from multiple neighboring indices of the 2D grid. These detections may or may not be averaged in a postprocess step.

TABLE 4a

| Correspondence mapping ($P^{RR}$) Channel 0 (background) | | | |
|---|---|---|---|
| 0.06 | 0.02 | 0.98 | 0.95 |
| 0.01 | 0.99 | 0.90 | 0.02 |
| 1.0 | 0.98 | 0.92 | 0.03 |
| 0.99 | 0.98 | 0.06 | 0.01 |

TABLE 4b

| Correspondence mapping ($P^{RR}$) Channel 1 (solid line) | | | |
|---|---|---|---|
| 0.83 | 0.95 | 0.01 | 0.03 |
| 0.97 | 0.00 | 0.03 | 0.02 |
| 0.0 | 0.01 | 0.01 | 0.05 |
| 0.01 | 0.01 | 0.06 | 0.01 |

TABLE 4c

| Correspondence mapping ($P^{RR}$) Channel 2 (dashed line) | | | |
|---|---|---|---|
| 0.11 | 0.03 | 0.01 | 0.02 |
| 0.02 | 0.01 | 0.07 | 0.96 |
| 0.0 | 0.01 | 0.07 | 0.92 |
| 0.0 | 0.01 | 0.88 | 0.98 |

TABLE 4d

| Lane type | | | |
|---|---|---|---|
| solid | solid | x | x |
| solid | x | x | dashed |
| x | x | x | dashed |
| x | x | dashed | dashed |

Table 4a-4d give raw outputs of the neural network. In the outputs there is an RR type pairing mask as the correspondence mapping with multiple foreground channels corresponding to lane type classification (namely, background, solid line, dashed line: from channel 0 to channel 2). The foreground region of the pairing mask, where the background value is smaller than a threshold (e.g. 0.5), is highlighted by bold letters in Table 4a.

It is preferred to introduce a correspondence mapping for the background, since there might be low probability values both in channel 1 and channel 2 correspondence mapping, which do not, however, behave as background. In an image showing solid (continuous) and dashed lane boundaries, the background can be separated based on channel 0 correspondence mapping, and the remaining parts are either solid lines or dashed lines. The content of Table 4d can be derived from Tables 4a-4c, marker which cells of the tensor (matrix) correspond to solid line and to dashed line.

In an alternative approach, the background could be separated by considering channel 1 and channel 2 correspondence mappings, separating—based on probability values—solid lines from channel 1 and dashed lines from channel 2, and the remaining part would be assigned as background.

In such an embodiment which is illustrated in Tables 4a-4d, 5a-5b, 6a-6c and 7a-7c, the correspondence mapping tensor (since generally there is at least one such tensor) comprises at least two lane boundary-type selective correspondence mapping tensor (a tensor comprised in another tensor may be called a subtensor) for at least two different lane types, respectively, the pairing probability value is a lane boundary-type selective probability value further characterizing the probability that the lane boundary is of a certain lane boundary-type, and the system is adapted for generating respective 3D lane detection data blocks based on at least two lane boundary-type selective correspondence mapping tensor for the at least two different lane types. As shown by the Tables below, lane boundary-type selective 3D projections can be obtained in this embodiment.

The RR mask describes correspondences between $D^R_{left}$ and $D^R_{right}$, which is illustrated in Table 5a and 5b. The lane type of a detection is determined by comparing the values of channel 1 and channel 2 at foreground indices. Alternatively, a lane type probability can be assigned to the detections.

TABLE 5a

Left image raw detections ($D^R_{left}$)

| | | | |
|---|---|---|---|
| 14.7 | 6.8 | x | x |
| 8.2 | x | x | 6.8 |
| x | x | x | 15.8 |
| x | x | 26.5 | 18.8 |

TABLE 5b

Right image raw detections ($D^R_{right}$)

| | | | |
|---|---|---|---|
| 12.6 | 4.8 | x | x |
| 1.7 | x | x | 0.2 |
| x | x | x | 3.8 |
| x | x | 8.9 | 0.8 |

Further raw outputs of the neural network are illustrated in Tables 5a and 5b (the values for solid and dashed lines are given in the same tensor (matrix), since the lane type is given in Table 4d and can be extracted in other ways too). The RR mask describes correspondences between $D^R_{left}$ and $D^R_{right}$. In this case both the left image raw detections and the right image raw detections take positive values (cf. FIG. 3A), corresponding to the search direction. Lowercase x denotes values predicted by the network but ignored because of the invalid correspondence.

TABLE 6a

Coordinate grid (u, v)

| | | | |
|---|---|---|---|
| (4, 4) | (12, 4) | (20, 4) | (28, 4) |
| (4, 12) | (12, 12) | (20, 12) | (28, 12) |
| (4, 20) | (12, 20) | (20, 20) | (28, 20) |
| (4, 28) | (12, 28) | (20, 28) | (28, 28) |

TABLE 6b

Left image space detection (u, v)

| | | | |
|---|---|---|---|
| (18.7, 4.0) | (18.8, 4.0) | x | x |
| (12.2, 12.0) | x | x | (34.8, 12.0) |
| x | x | x | (43.8, 20.0) |
| x | x | (46.5, 28.0) | (46.8, 28.0) |

TABLE 6c

Right image space detection (u, v)

| | | | |
|---|---|---|---|
| (16.6, 4.0) | (16.8, 4.0) | x | x |
| (5.7, 12.0) | x | x | (28.2, 12.0) |
| x | x | x | (31.8, 20.0) |
| x | x | (28.9, 28.0) | (28.8, 28.0) |

Tables 6a-6c give illustration of the calculations done in the pairing module for the inputs given in Tables 4a-4d, 5a-5b. The values of Tables 6a-6c are calculated similarly to Tables 2a-2c, therefore, the coordinate grid is calculated based on Eq. (5). Detection pairs are predicted from the foreground indices indicated by bold letters. The pairing module calculates the image position of the detection pairs by adding the left and right image raw detection tensors from Tables 5a-5b to the coordinate grid, according to Eq. (10). Depending on the embodiment, the image position of detections is calculated only for the foreground region (as it is given in the present example), or everywhere, but only valid pairs will contribute to the final output.

TABLE 7a

Disparity

| | | | |
|---|---|---|---|
| 2.1 | 2.0 | x | x |
| 6.5 | x | x | 6.6 |
| x | x | x | 12.0 |
| x | x | 17.6 | 18.0 |

TABLE 7b 3D projection

| | | | |
|---|---|---|---|
| (−5.4, 0.5, 95.2) | (−5.6, 0.5, 100.0) | x | x |
| (−2.7, 1.4, 30.8) | x | x | (0.8, 1.4, 30.3) |
| x | x | x | (1.2, 1.4, 16.7) |
| x | x | (0.9, 1.4, 11.4) | (0.9, 1.4, 11.1) |

TABLE 7c

| Lane type | 3D detections |
|---|---|
| solid | (−5.4, 0.5, 95.2) |
| solid | (−5.6, 0.5, 100.0) |
| solid | (−2.7, 1.4, 30.8) |
| dashed | (0.8, 1.4, 30.3) |
| dashed | (1.2, 1.4, 16.7) |

TABLE 7c-continued

| Lane type | 3D detections |
|---|---|
| dashed | (0.9, 1.4, 11.4) |
| dashed | (0.9, 1.4, 11.1) |

The disparity module calculates the horizontal distance between the left and right detections by subtracting of the two corresponding tensors of Tables 6b and 6c, according to Eq. (11).

The 3D projection module maps the detection pairs to the 3D space of the camera coordinate system from the left image coordinate of the detections and the disparity according to Eqs. (3-4), with $c_x=30$, $c_y=3$, $f=200$, $B=1$. Lowercase x denotes values predicted by the network but ignored because of the invalid correspondence. Table 7c lists the valid 3D detections with the corresponding lane types.

As it is already observable in Table 7b, results in the same raw correspond to the same 3D point. This is a result of the fact that a wider window has been considered in the present calculations. Only one of the equivalent results has to be taken into account (or these can be averaged); accordingly, the calculations show that it is not disadvantageous to consider wider window.

It is noted, that similarly to Tables 6b and 6c, the data is not separated according to lane type in Tables 7a and 7b, as well. This can be done e.g. using Table 4d, and the final result given also in Table 7b, can be given in a lane boundary-type selective manner in Table 7c.

Some compact embodiments using pairing masks as the correspondence mapping are introduced above.

Four different pairing masks have been listed, from which any subset can be used in the 3D lane detection system with the corresponding raw detections. The various types of raw detections and pairing masks may be implemented as different outputs of the neural network, or as different channels of the unique left and right image raw detection and correspondence mapping outputs.

A trivial equivalent embodiment is when the raw detection tensor gives the unsigned relative distance from the coordinate grid to the closest lane boundary along the search direction. Then the pairing module is changed accordingly to predict the image space detections (the raw detections $D^R_{left/right}$ are added to the coordinate grid, and the raw detections $D^L_{left/right}$ are subtracted).

A search direction has been defined for the raw detection tensors. Instead, in another embodiment, one can define $D_{left/right}$ as the relative signed distance from the coordinate grid to the closest lane boundary projection either to the left or right. Then a slightly different pairing mask should be constructed to pair the relevant detections.

In the following, a further embodiment is introduced which is constructed with a stereo instance segmentation approach developed for the present invention by the inventors. In this embodiment the correspondence mapping is not a single 2D grid for the left and right images (which can have also more channels), but two 2D grids corresponding to the first and second images, respectively (for an example, see Tables 8a and 8b below).

The objective of a known instance segmentation technique (see e.g. Davy Neven et al., Towards End-to-End Lane Detection: an Instance Segmentation Approach, 2018, arXiv: 1802.05591; Yen-Chang Hsu et al., Learning to Cluster for Proposal-Free Instance Segmentation, 2018, arXiv: 1803.06459) is to find objects on an image by labelling all pixels of the image such that pixels corresponding to the same object obtain the same label and pixels corresponding to different objects obtain different labels.

With some untrivial modifications (including the application of a two-channel correspondence mapping framework as detailed below), the instance segmentation technique has been generalized as a stereo instance segmentation technique to be applicable on image pairs in the correspondence mapping framework in the 3D lane detection system in an embodiment. In the stereo instance segmentation approach applied in this embodiment, pixels obtain the same label if they correspond to the same physical instance and obtain different labels if the pixels are not from the same object (the neural network is taught in this embodiment to be able to make indices the first and second images in this way), irrespective to which image the pixels are taken from (thus, the labelling is applied in a uniform, consistent way onto the images). That is, in other words, the stereo instance segmentation is a consistent labelling of two images (consistent labelling refers to that the same labels are used consistently in the two channels of the correspondence mapping tensor). In summary, in this embodiment, in the learning procedure of the neural network, it has been taught for the neural network to output these consistent labels (i.e. to perform consistent labelling).

In the known instance segmentation approaches referenced above, a model fitting is done based on the results of the instance segmentation process. Also, according to other aspects, the results to be displayed are obtained in a highly different way than in the stereo instance segmentation applied in an embodiment of the invention.

In the case of the 3D lane detection method and system according to the invention, the objects (to be labelled) can be regions around the projected lane boundary lines (projection mean a visualization on the first or second image). The width of this region is a parameter, which may be chosen as a constant, or it may depend on properties of the lane boundary (distance, type, etc.). The region not corresponding to any of the lane boundaries may obtain a unique, background label.

These regions can be constructed from the known position of the lanes during training. With a suitable loss function, the neural network learns to find these regions and assign labels consistent with the ground truth data. By consistent we mean that a permutation of the ground truth labels may be accepted as a perfect prediction (since the values of labels are not special, any value can be selected as a label). At inference time (i.e. when the method and system for 3D lane detection is in use) the predicted mask is used to obtain the detection pairs on the first (left) and second (right) images.

This type of correspondence mapping is very flexible, it could be used to pair detections irrespective to how they were predicted by the neural network, e.g. by classification, dense regression, or by predicting model parameters such as splines. This flexibility is due to that the stereo instance segmentation defines correspondences between the image space detections rather than the raw detections. Accordingly, the pairing module calculates first the image position corresponding to the raw detections, and the detection pairs are selected by the stereo instance segmentation, irrespective to the representation used in the raw detections. Some raw detections may not be paired by the stereo instance segmentation, then they are ignored (or dropped) by the pairing module.

In an embodiment, the stereo instance segmentation is used as a foreground region (i.e. the foreground region is specified based on the results of the stereo instance segmentation), from which the precise location of the lane boundary is predicted, like in the previous example with a single pairing mask. In other words, correspondence mapping for both images are used to decide the location (not a single pairing mask as above, see also the example given below in Tables 8-10). Detections are not predicted from the background. The raw detection outputs $D_{left}$ and $D_{right}$ can be the signed distance of the lane boundary from the foreground position of the stereo instance segmentation, along the epipolar direction on the left and right images respectively.

An embodiment based on the stereo instance segmentation introduced within the framework of the invention, can be constructed generally, i.e. based on correspondence mapping data which is not restricted to be a (separate) correspondence mapping data block (however, this embodiment is illustrated by the help of correspondence mapping data block).

Thus, in summary, the correspondence mapping data comprises first channel correspondence mapping data elements (these may be data blocks, tensors or any general form of data like the correspondence mapping data in general) corresponding to the first image and second channel correspondence mapping data elements corresponding to the second image (i.e. separate data elements—can be considered as channels of the main correspondence mapping data—for both images, as also the example illustrated in Tables 8a-8d, 9a-9d, and 10a-10b shows), each third tensor element of the first channel correspondence mapping tensor and the second channel correspondence mapping tensor is a label characterizing whether the respective third tensor element corresponds to a lane boundary (the value is e.g. zero when not, and—as shown in Tables 8a and 8b below—a certain label (e.g. '1' and '2') when a certain lane boundary is found), wherein the same label corresponds to the same lane boundary, as well as different labels correspond to different lane boundaries in the first channel correspondence mapping data elements and the second channel correspondence mapping data elements, respectively, and the data elements of the first channel correspondence mapping data elements and second channel correspondence mapping data elements corresponding to a lane boundary are selected as foreground correspondence mapping data elements, which foreground correspondence mapping data elements are used in the pairing step (in the pairing module) as the output data of the image processing step (image processing module), i.e. are maintained for further calculations (the Tables below show that the foreground can be different for each starting image, but this fact does not cause problem for the calculations). If raw detection data is utilized, the corresponding raw detection data can also be forwarded to the pairing step (see also the approach of FIG. 1 and the example introduced with Tables 8a-8d).

In this case, the correspondence mapping data is a label showing whether the elements of the first and second channel correspondence mapping data correspond to a lane boundary or not, in other words whether it is a lane boundary point or a background point. Note that it originally required that the correspondence mapping data determines the correspondence between a first lane boundary group of the first image and a second lane boundary group of the second image. Thus, the labels of each channel correspondence mapping data will show the correspondence with the other channel (the labels will be the same for a certain lane boundary which is observable in both images). Examples for channel correspondence mapping data are given in Tables 8a and 8b; these examples are in tensor form, which is a possible representation for channel correspondence mapping data.

As illustrated in Tables 8a-8d below, the instance segmentation approach—based on the general definitions given in the previous paragraphs—can be used in such an embodiment which is based on raw detection tensors, coordinate grid tensors, etc. However, as it is also given below, the instance segmentation approach can be combined with the model-based embodiment.

In an embodiment, the various labels can be represented by orthogonal vectors similar to the embodiment with pairing masks representing lane property, which was introduced previously. That is, the correspondence mapping tensor elements are vectors, whose components describe the probability of corresponding to the various labels. In Tables 8a and 8b the labels corresponding to the maximal probability is given as the correspondence mapping.

The name of the first and second channel correspondence mapping data elements (e.g. (sub)tensors) wishes to emphasize that these constitute channels of the original tensor, and they play the role of the correspondence mapping data in common. See Tables 8a and 8b for these; it is shown by these tables also that the decision on two pieces of data whether these are in correspondence or not can be made on the information comprised in both channels of the correspondence mapping tensor (data block). Although, herebelow Tables 8a and 8b are simply labelled as 'correspondence mapping', the remaining part of the label ('left/right instance segmentation') is used to enforce the channel-based approach (different labels could be also used for Tables 8a and 8b).

These two channels of the original tensor could also be a part of a single tensor by using a separate index for the channel. This unifying of subtensors may be used in other embodiments also where more tensors (may be called subtensors) are comprised in a tensor; this possibility comes from the general mathematical framework of a tensor.

Tables 8a-8d illustrate the raw outputs of the neural network, that is the correspondence mapping and the left and right image raw detection tensors. Tables 9a-9d demonstrate the tensors and calculations appearing in the pairing module, and Tables 10a and 10b demonstrate the output of the disparity and the 3D projection modules.

TABLE 8a

Correspondence mapping (Left instance segmentation)

| 0 | 1 | 1 | 0 |
|---|---|---|---|
| 0 | 1 | 0 | 0 |
| 1 | 0 | 0 | 2 |
| 0 | 0 | 0 | 2 |

TABLE 8b

Correspondence mapping (Right instance segmentation)

| 0 | 1 | 0 | 0 |
|---|---|---|---|
| 1 | 1 | 0 | 0 |
| 1 | 0 | 0 | 2 |
| 0 | 0 | 2 | 2 |

TABLE 8c

Left image raw detections ($D_{left}$)

| x | 10.2 | 2.0 | x |
|---|------|-----|---|
| x | 3.4  | x   | x |

TABLE 8c-continued

| Left image raw detections ($D_{left}$) | | | |
|---|---|---|---|
| 1.1 | x | x | 7.1 |
| x | x | x | 5.1 |

TABLE 8d

| Right image raw detections ($D_{right}$) | | | |
|---|---|---|---|
| x | 7.9 | x | x |
| 2.1 | −5.8 | x | x |
| −15.0 | x | x | −10.5 |
| x | x | −6.4 | −14.4 |

Tables 8a-8d give the illustration of the raw outputs of a neural network in an embodiment, which uses the stereo instance segmentation for correspondence mapping (a region around a line boundary is defined; the exemplary results are obtained by a stride of 8), and the raw detections are relative distances to the coordinate represented by the tensor index (coordinate grid), like the previous embodiment with pairing masks. In this example the raw detections are relative distances, but the correspondence mapping based on stereo instance segmentation can be applied to detections coming from arbitrary representations.

As it is observable also in FIGS. 3A-3C, the lane boundary points on the left image are placed on the right hand side of the corresponding lane boundary points of the right image, if $c_{x,left} - c_{x,right} \geq 0$. If the contents of Table 8a and Table 8b are compared, a good estimation for the position of lane boundary '1' and '2' can be given, which is refined by the values in Table 8c and Table 8d.

Valid results in $D_{left}$ and $D_{right}$ are maintained based on the results of left instance segmentation and right instance segmentation, respectively. In other words, there is a lowercase x in $D_{left}$ and $D_{right}$ where there is no '1' or '2' in Table 8a and Table 8b, respectively. Accordingly, the foreground estimation is separated at this stage for $D_{left}$ and $D_{right}$ (it remains separated also in Tables 9b and 9c, see below).

Note that as the raw detection tensor was chosen to be the signed relative distance, if both side of a lane boundary is in the foreground region, the sign of the raw detections change.

TABLE 9a

| Coordinate grid of detection tensor (u, v) | | | |
|---|---|---|---|
| (4, 4) | (12, 4) | (20, 4) | (28, 4) |
| (4, 12) | (12, 12) | (20, 12) | (28, 12) |
| (4, 20) | (12, 20) | (20, 20) | (28, 20) |
| (4, 28) | (12, 28) | (20, 28) | (28, 28) |

TABLE 9b

| Left image space detection tensor | | | |
|---|---|---|---|
| x | (22.2, 4.0) | (22.0, 4.0) | x |
| x | (15.4, 12.0) | x | x |
| (5.1, 20.0) | x | x | (35.1, 20.0) |
| x | x | x | (33.1, 28.0) |

TABLE 9c

| Right image space detection tensor | | | |
|---|---|---|---|
| x | (19.9, 4.0) | x | x |
| (6.1, 12.0) | (6.2, 12.0) | x | x |

TABLE 9c-continued

| Right image space detection tensor | | | |
|---|---|---|---|
| (−11.0, 20.0) | x | x | (17.5, 20.0) |
| x | x | (13.6, 28.0) | (13.6, 28.0) |

TABLE 9d

| Image space detection pairs | | |
|---|---|---|
| label | Left | Right |
| 1 | (22.1, 4.0) | (19.9, 4.0) |
| 1 | (15.4, 12.0) | (6.05, 12.0) |
| 1 | (5.1, 20.0) | (−11.0, 20.0) |
| 2 | (35.1, 20.0) | (17.5, 20.0) |
| 2 | (33.1, 28.0) | (13.6, 28.0) |

Tables 9a-9d give an example for the calculations of a pairing module corresponding to the representations shown in Tables 8a-8d. The coordinate grid is generated according to Eq. (5) with $stride_x = stride_y = 8$, $offset_x = offset_y = 4$. The image space detections are given by adding the coordinate grid to the raw detections, like in Tables 2a-2c and in Eq. (10). Lowercase x refers to predicted raw detections which are not used because are considered as background according to the stereo instance segmentation.

In Table 9d the image space detection pairs are collected. The image space detections corresponding to the same label and same vertical coordinates are averaged separately on the left and right images before forming pairs (in such a way, the first coordinate of left of the first pair is 22.1). Thus, these results help to increase precision.

TABLE 10a

| Disparity |
|---|
| 2.2 |
| 9.35 |
| 16.1 |
| 17.6 |
| 19.5 |

TABLE 10b

| 3D projection |
|---|
| (−3.6, 0.5, 90.9) |
| (−1.5, 1.0, 21.4) |
| (−1.5, 1.1, 12.4) |
| (0.3, 1.0, 11.4) |
| (0.2, 1.3, 10.3) |

The disparity module calculates the horizontal distance between the left and right detections by the subtraction of the two corresponding tensors from Table 9, according to Eq. (11), see the disparity results in Table 10a. The different rows correspond to different detections, as in the Image space detection pairs in Table 9d. In Table 10b, the 3D projection module maps the detection pairs to the 3D space of the camera coordinate system from the left image coordinate of the detections and the disparity according to Eqs. (3-4), with $c_x = 30$, $c_y = 3$, $f = 200$, $B = 1$. Table 10b may also have a column for designation the label of a result.

In a different embodiment, the image processing module does not have any raw detection outputs, only the stereo instance segmentation as correspondence mapping. As discussed previously, the stereo instance segmentation on the left and right images surround the lane boundaries, and gives a good estimation for their position. The precise position of the lane boundaries can be determined by averaging or a least squares model fitting. Accordingly, in an embodiment, the paring module calculates the image space position of the detections corresponding to the various labels by a weighted average of the coordinate grid along every raw, where the weight is a differentiable function of the probability of the certain label at the grid position. In another embodiment, the pairing module fits a model to the point cloud defined by the coordinate grid, and weighted by the label probabilities for every label by least squares fitting. Samples are taken from this model to obtain the detection pairs, which are projected to the 3D space in the 3D projection module. As the least squares fitting and sampling from the model is differentiable, this embodiment fits in the general framework of the 3D lane detection system. More details about models is introduced below in the model-based embodiments, which differ from this approach in that raw detections are utilized, which are represented by model parameters.

The stereo instance segmentation used in an embodiment of the invention is illustrated in FIGS. 7A and 7B showing the image of a first camera and a second camera, respectively. In each of the images three lane boundaries are observable, namely a first lane boundary projection 150a, a second lane boundary projection 152a and a third lane boundary projection 154a in FIG. 7A and, corresponding to these, a first lane boundary projection 150b, a second lane boundary projection 152b and a third lane boundary projection 154b in FIG. 7B. It is observable that the images have different viewpoint.

All of the lane boundaries have a surrounding region which is labelled by the stereo instance segmentation technique. In FIG. 7A, a region 156a surrounds the lane boundary projection 150a; the region 156a holds '1' as instance segmentation index; a surrounding region 158a is designated for lane boundary projection 152a (the label of the region 158a is '2'), as well as a region 160a (with label '3') for the lane boundary projection 154a. Respective regions 156b, 158b and 160b (with labels '1', '2' and '3') are designated also in FIG. 7B. The pixels around the same lane boundary lines get the same labels on the first and second camera images.

These region designations are used for correspondence mapping in this technique, as it has been illustrated in the above example. The correspondence mapping tensors illustrated in Tables 8a-8b give a representation of the area of a first image and a second image. Thus, the surrounding regions (areas) designated in the images can be represented in these tensors by taking labels in the respective elements of the tensor (in the example of Tables 8a-8b, two different labels, namely '1' and '2' is used; however, in the illustrative example of FIGS. 7A and 7B we have three different indices).

Figures 8A, 8B:
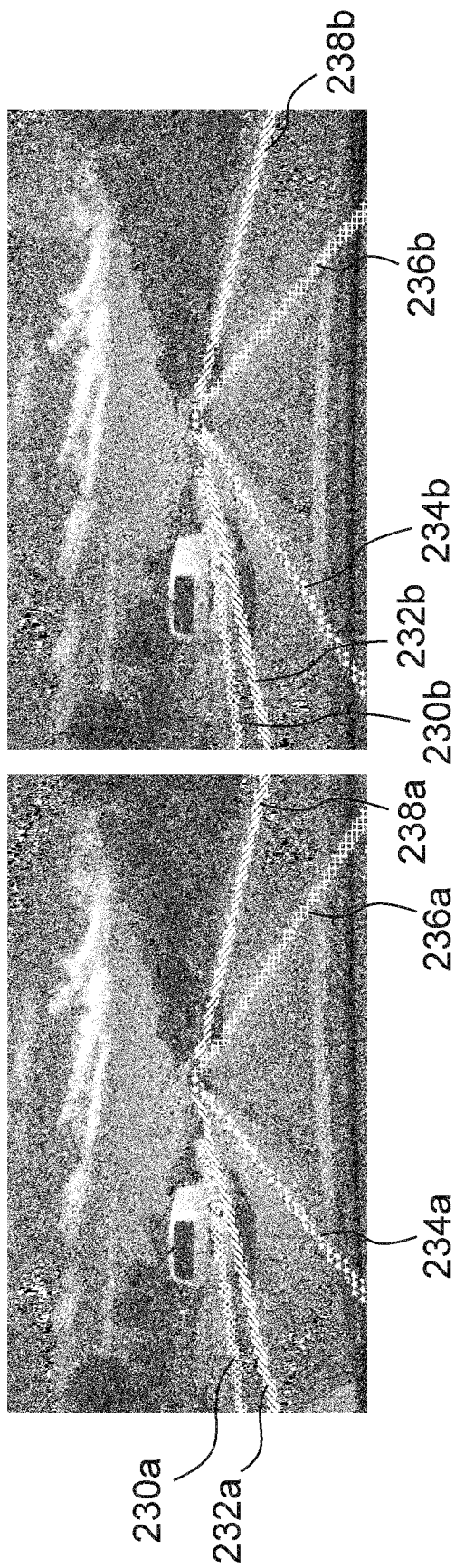
FIGS. 8A and 8B are schematized exemplary left and right images showing lane boundaries and the correspondence mapping obtained by stereo instance segmentation.

FIGS. 8A and 8B illustrates stereo instance segmentation on real images with the prediction of a trained neural network designated thereon. FIGS. 8A and 8B give a first image of a first camera and a second image of a second camera. Regions 230a, 232a, 234a, 236a, 238a and 230b, 232b, 234b, 236b, 238b designated by instance segmentation are highlighted by white on FIGS. 8A and 8B, respectively (the regions corresponding to each other has the same number with 'a' and 'b', and are represented by the same pattern, such as left/right stripes, stars, '+' and 'x' shaped gridlines, that is, the pattern represents the labels assigned by the stereo instance segmentation). These are the starting instance segmentation regions (similarly to the regions illustrated in FIGS. 7A and 7B, and in Tables 8a-8b) based on which the respective embodiment of the method and system according to the invention is performed. FIGS. 8A and 8B is somehow analogous with FIGS. 4A-4F, since both figure groups show the correspondence mapping in the respective examples.

In the following, a further embodiment is specified, which we call model-based embodiment.

In this embodiment, the lane boundaries on the left and right images may also be represented by model parameters predicted by the neural network (in general, the image processing module trained by machine learning), e.g. spline parameters. Accordingly, the raw detection specifying the arrangement of the lane boundaries, is not a group of distance like parameters like above, but the neural network outputs e.g. spline parameters which characterize lane boundaries in a different way.

A model of a lane boundary may be represented by a variable number of parameters (N). In the case of spline model, N depends on the number of control points and on the polynomial degree of the spline. N might be fixed by the architecture, e.g. when the number of control points is fixed. Alternatively, the number of control points used to represent the lane boundary might also be decided by the neural network.

In general, the raw detections are different sets of model parameters for each lane boundary. In those embodiments which are illustrated by the tables above, these parameters are a set of distance-type parameters; these distances are lane boundary-coordinate grid point distances. However, it is not necessary to have a coordinate grid to specify a lane boundary, in the present model-based embodiment, when the lane boundaries are represented by splines, no use of coordinate grid is needed.

For example, the neural network may find $m_{l/r}$ number of models of lane boundaries (i.e. $m_{l/r}$ is the number of the detections) on the left/right image, each with different parameters, $a_{l/r,k}$, where k is the index of the detection. The number of model parameters may also differ between the different detections. Such varying number of detections could be achieved e.g. by an LSTM cell (Long short-term memory cell). The left and right image raw detections are formalized as $$D_l = \begin{pmatrix} a_{l,1} = \{a_{l,1,1}, \ldots, a_{l,1,N_1}\} \\ a_{l,2} = \{a_{l,2,1}, \ldots, a_{l,2,N_2}\} \\ \ldots \\ a_{l,m_l} = \{a_{l,m_l,1}, \ldots, a_{l,m_l,N_{m_l}}\} \end{pmatrix}$$

$$D_r = \begin{pmatrix} a_{r,1} = \{a_{r,1,1}, \ldots, a_{r,1,N_1}\} \\ a_{r,2} = \{a_{r,2,1}, \ldots, a_{r,2,N_2}\}\} \\ \ldots \\ a_{r,m_r} = \{a_{r,m_r,1}, \ldots, a_{r,m_r,N_{m_r}}\} \end{pmatrix}$$

These raw detections $D_{l/r}$ are more generalized data blocks than the tensors (matrices) introduced above. Since the necessary number of model parameters ($N_1$, $N_2$, $N_{ml}$) can be different in the rows, the rows of the above data block are not necessarily of equal length (there is no reason to be of equal length but they can be, theoretically).

A representation loss may be assigned to the raw detections, which representation loss compares the model parameters of the lane boundaries to the ground truth model parameters thereof. However, various model parameters may produce similarly good detections, which is better captured by the image space loss.

The image coordinates of the detections are calculated from the model of the lane boundary which the neural network predicts, which step is done in the pairing module. The model M of a lane boundary is an implicit function of the image coordinates (u,v) and the model parameters:

$$M(u,v;a_{l/r,k})=0$$

The simpler case is when the model is parametrized by v (the above equation is rearranged):

$$u=M'(v;a_{l/r,k})$$

The correspondence mapping in this embodiment is a mapping between the indices of the detections, e.g.

$$C=\{(l,i)\leftrightarrow(r,j)|i\in[1,m_l],j\in[1,m_r], a_{l,i} \text{ corresponds to the same physical lane as } a_{r,j}\}$$

i.e. gives the correspondences between the sets of left and the right parameters. Accordingly, the raw detections give preferably substantially the inputs of the correspondence mapping data block. In another embodiment the number of models of lane boundaries $m_l$ and $m_r$ are fixed by the architecture (irrespective of how many lane boundaries are visible on the image), and an ordering is defined among the lane boundaries. In this case the raw detections are not necessarily inputs of the correspondence mapping data block.

The pairing module goes through the correspondences in C and takes samples from model M or M', e.g. at different horizontal lines indexed by v. This provides detection pairs (for the $a_{l,i}$—$a_{r,j}$ pairs the above equation given by M' gives two different values for 'u'), which is processed by the disparity module and the 3D projection module (i.e. the disparity is also calculated in this embodiment from the two different values of 'u', more particularly, from its left and right values).

The training can be driven by the image space loss. Sampling from the model of the lane boundary is a differentiable operation, hence gradients can pass backwards through the module to the neural network.

In summary, in the above model-based embodiment of the method and the system:
- the arrangement of each first member having a first index (i.e. each lane boundary has a respective index) of the first lane boundary group in the first image is defined by first model parameters in the first image raw detection data block,
- the arrangement of each second member having a second index of the second lane boundary group in the second image is defined by second model parameters in the second image raw detection data block, and
- the correspondence mapping data block determines the correspondences between a respective first index and second index based on whether the first index and the second index correspond to the same lane boundary.

The above approach introducing the first and second index may also be combined with the stereo instance segmentation approach introduced above (not only with that correspondence mapping approach, which is mentioned in the previous paragraph), i.e. the correspondence mapping approach of stereo instance segmentation may be performed for the processing of the indexed lane boundaries.

In this case the pairing module iterates through the elements of the left and right image raw detections, and generates the image-space detections by taking samples from the corresponding models e.g. at different horizontal lines indexed by v. These image-space detections obtain label from the stereo-instance segmentation. Points on the left and right image lying on the same horizontal line and characterized by the same label define detection pairs. Preferably, points on the same horizontal line with same label may be averaged separately on the left and right images before producing the pairs. Image space detections labelled as background do not contribute to image space detection pairs.

An embodiment of the invention relates to a non-transitory computer readable medium storing instructions which, when executed by a computer, cause the computer to carry out the method according to the invention.

The advantages of the system and method according to the invention are hereby summarized:
- The inventive solution is based on the above described correspondence mapping approach. Accordingly, no explicit stereo matching step is applied in the invention.
- According to the invention, lowered noise level can be achieved in the 3D detections. On the contrary, in prior art approaches, the stereo matching results in noise on homogeneous surfaces (like the surface of the road), and gives results of inferior quality at the lane boundaries.
- The method and system according to the invention is operable also in occluded regions.
- Preferably, in the embodiment applied on a neural network the method and system for training is end-to-end learnable and differentiable.

Embodiments of the invention described above, or portions thereof, may be implemented using one or more computer devices or systems, collectively referred to herein as a "computer". Computers may include a processor, a memory, an input/output (I/O) interface, and a Human Machine Interface (HMI). A computer may also be operatively coupled to one or more external resources via a network. External resources may include, but are not limited to, servers, databases, mass storage devices, peripheral devices, cloud-based network services, or any other resource that may be used by the computer.

The processor of the computer may operate under the control of an operating system that resides in memory. The operating system may manage computer resources so that computer program code embodied as one or more computer software applications, such as an application residing in memory, may have instructions executed by the processor. One or more data structures may also reside in memory, and may be used by the processor, operating system, or application to store or manipulate data.

The I/O interface may provide a machine interface that operatively couples the processor to other devices or systems. Applications running on the computer may thereby work cooperatively with external resources or networks to provide the various features, functions, applications, processes, or modules comprising embodiments of the invention. The application may also have program code that is executed by one or more external resources, or otherwise rely on functions or signals provided by other system or network components external to the computer. Indeed, given the nearly endless hardware and software configurations possible, persons having ordinary skill in the art will understand that embodiments of the invention may include applications that are located externally to the computer, distributed among multiple computers or other external resources, or provided by computing resources (hardware and software) that are provided as a service over a network, such as a cloud computing service.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile tangible media, and removable and non-removable tangible media implemented in any method or technology for storage of data, such as computer-readable instructions, data structures, program modules, or other data. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention is, of course, not limited to the preferred embodiments described in details above, but further variants, modifications and developments are possible within the scope of protection determined by the claims. Furthermore, all embodiments that can be defined by any arbitrary dependent claim combination belong to the invention.

The invention claimed is:

1. A method for lane detection comprising:
    generating, by an image processing module trained by machine learning, output data based on an image pair including a first image having a first lane boundary group and a second image having a second lane boundary group, the output data including correspondence mapping data that defines a correspondence between the first lane boundary group and the second lane boundary group,
    generating an image space detection data block of image space detection pairs based on the output data, and
    generating a 3D lane detection data block using triangulation and calibration data corresponding to the first image and the second image based on a first part of the image space detection data block corresponding to a first member of the image space detection pairs and a second part of the image space detection data block corresponding to a second member of the image space detection pairs.

2. The method of claim 1, wherein:
    the correspondence mapping data is comprised by a correspondence mapping data block, and
    the output data further comprises:
        a first image raw detection data block that defines an arrangement of each first member of the first lane boundary group, and
        a second image raw detection data block that defines an arrangement of each second member of the second lane boundary group.

3. The method of claim 2, wherein:
    the output data is generated for a coordinate grid represented by a coordinate grid tensor having a plurality of grid tensor elements,
    the first image raw detection data block is a first image raw detection tensor corresponding to the coordinate grid tensor and having a plurality of first tensor elements each comprising a respective first distance value measured from a corresponding grid tensor element of a closest first lane boundary point of the first lane boundary group in a first search direction in the first image,
    the second image raw detection data block is a second image raw detection tensor corresponding to the coordinate grid tensor and having a plurality of second tensor elements each comprising a respective second distance value measured from a corresponding grid tensor element of a closest second lane boundary point of the second lane boundary group in a second search direction in the second image, and
    the correspondence mapping data block is a correspondence mapping tensor corresponding to the coordinate grid tensor and having a plurality of third tensor elements characterizing whether the closest first lane boundary point and the closest second lane boundary point correspond to the same lane boundary, and
    the image space detection data block is generated by using the coordinate grid tensor to generate a tensor of the image space detection pairs.

4. The method of claim 3, wherein:
    the correspondence mapping tensor is a pairing correspondence mapping tensor, each of its third tensor elements having a pairing probability value characterizing a probability that the closest first lane boundary point and the closest second lane boundary point correspond to the same lane boundary and are positioned within a window size from a coordinate grid tensor element corresponding to the respective third tensor element, and
    the third tensor elements having a respective probability value above a predetermined first threshold are selected as foreground third tensor elements,
    wherein the foreground third tensor elements and the corresponding first and second tensor elements are used as the output data from which the image space detection data block is generated.

5. The method of claim 4, wherein the first search direction and the second search direction are selected as one of the following combinations of respective search directions: a left direction on the first image and the left direction on the second image, the left direction on the first image and a right direction on the second image, the right direction on the first image and a left direction on the second image, and the right direction on the first image and the right direction on the second image.

6. The method of claim 4, wherein:
    the correspondence mapping tensor comprises at least two lane boundary-type selective correspondence mapping tensors, one for each of at least two different lane types,
    the pairing probability value is a lane boundary-type selective probability value further characterizing the probability that a lane boundary corresponding to the closest first lane boundary point and the closest second lane boundary point is of a certain lane boundary-type, and
    respective 3D lane detection data blocks are generated based on the at least two lane boundary-type selective correspondence mapping tensors for the at least two different lane types.

7. The method of claim 2, wherein:
    the arrangement of each first member having a first index of the first lane boundary group in the first image is defined by first model parameters in the first image raw detection data block,
    the arrangement of each second member having a second index of the second lane boundary group in the second image is defined by second model parameters in the second image raw detection data block, and
    the correspondence mapping data block determines correspondences between a respective first index and a respective second index based on whether the first index and the second index correspond to the same lane boundary.

8. The method of claim 1, wherein the correspondence mapping data further defines the arrangement of each first member of the first lane boundary group and the arrangement of each second member of the second lane boundary group.

9. The method of claim 1, wherein:
    the correspondence mapping data comprises first channel correspondence mapping data elements corresponding to the first image and second channel correspondence mapping data elements corresponding to the second image,
    each of the first channel correspondence mapping data elements and the second channel correspondence mapping data elements defines a label characterizing whether the respective data element corresponds to a lane boundary, wherein the same label corresponds to the same lane boundary and different labels correspond to different lane boundaries, and the data elements of the first channel correspondence mapping data elements and the second channel correspondence mapping data elements corresponding to the lane boundary are selected as foreground correspondence mapping data elements that are used as the output data from which the image space detection data block is generated.

10. The method of claim 1, wherein the image processing module is implemented by a neural network.

11. The method of claim 1, wherein the output data is generated by the image processing module based on, in addition to actual frames of the first image and the second image, at least one additional frame of the first image and the second image preceding or succeeding the actual frames.

12. The method of claim 1, wherein the image pair is a stereo image pair of a left image and a right image.

13. A system for lane detection comprising:
one or more processors; and
a memory coupled to the one or more processors and including program code that, when executed by at least one of the one or more processors, causes the system to:
generate, by an image processing module trained by machine learning, output data based on an image pair of a first image having a first lane boundary group and a second image having a second lane boundary group, the output data including correspondence mapping data that defines a correspondence between the first lane boundary group and the second lane boundary group,
generate an image space detection data block of image space detection pairs based on the output data, and
generate a 3D lane detection data block using triangulation and calibration data corresponding to the first image and the second image based on a first part of the image space detection data block corresponding to a first member of the image space detection pairs and a second part of the image space detection data block corresponding to a second member of the image space detection pairs.

14. The system of claim 13, wherein:
the correspondence mapping data is comprised by a correspondence mapping data block, and
the output data further comprises:
a first image raw detection data block that defines an arrangement of each first member of the first lane boundary group, and
a second image raw detection data block that defines an arrangement of each second member of the second lane boundary group.

15. The system of claim 14, wherein:
the output data is generated for a coordinate grid represented by a coordinate grid tensor having a plurality of grid tensor elements,
the first image raw detection data block is a first image raw detection tensor corresponding to the coordinate grid tensor and having a plurality of first tensor elements each comprising a respective first distance value measured from a corresponding grid tensor element of a closest first lane boundary point of the first lane boundary group in a first search direction in the first image,
the second image raw detection data block is a second image raw detection tensor corresponding to the coordinate grid tensor and having a plurality of second tensor elements each comprising a respective second distance value measured from a corresponding grid tensor element of a closest second lane boundary point of the second lane boundary group in a second search direction in the second image, and
the correspondence mapping data block is a correspondence mapping tensor corresponding to the coordinate grid tensor and having a plurality of third tensor elements characterizing whether the closest first lane boundary point and the closest second lane boundary point correspond to the same lane boundary, and
the image space detection data block is generated by using the coordinate grid tensor to generate a tensor of the image space detection pairs.

16. The system of claim 15, wherein:
the correspondence mapping tensor is a pairing correspondence mapping tensor, each of its third tensor elements having a pairing probability value characterizing a probability that the closest first lane boundary point and the closest second lane boundary point correspond to the same lane boundary and are positioned within a window size from a coordinate grid tensor element corresponding to the respective third tensor element, and
the third tensor elements having a respective probability values above a predetermined first threshold are selected as foreground third tensor elements, wherein the foreground third tensor elements and the corresponding first tensor elements and second tensor elements are used as the output data from which the image space detection data block is generated.

17. The system of claim 16, wherein the first search direction and the second search direction are selected as one of the following combinations of respective search directions: a left direction on the first image and the left direction on the second image, the left direction on the first image and a right direction on the second image, the right direction on the first image and a left direction on the second image, and the right direction on the first image and the right direction on the second image.

18. The system of claim 16, wherein:
the correspondence mapping tensor comprises at least two lane boundary-type selective correspondence mapping tensors, one for each of at least two different lane types,
the pairing probability value is a lane boundary-type selective probability value further characterizing the probability that a lane boundary corresponding to the closest first lane boundary point and the closest second lane boundary point is of a certain lane boundary-type, and
respective 3D lane detection data blocks are generated based on the at least two lane boundary-type selective correspondence mapping tensors for the at least two different lane types.

19. The system of claim 14, wherein:
the arrangement of each first member having a first index of the first lane boundary group in the first image is defined by first model parameters in the first image raw detection data block,
the arrangement of each second member having a second index of the second lane boundary group in the second image is defined by second model parameters in the second image raw detection data block, and
the correspondence mapping data block determines correspondences between a respective first index and a respective second index based on whether the first index and the second index correspond to the same lane boundary.

20. The system of claim 13, wherein the correspondence mapping data further defines the arrangement of each first member of the first lane boundary group and the arrangement of each second member of the second lane boundary group.

21. The system of claim 13, wherein:
the correspondence mapping data comprises first channel correspondence mapping data elements corresponding to the first image and second channel correspondence mapping data elements corresponding to the second image,
each of the first channel correspondence mapping data elements and second channel correspondence mapping data elements defines a label characterizing whether the respective data element corresponds to a lane boundary, wherein the same label corresponds to the same lane boundary and different labels correspond to different lane boundaries, and
the data elements of the first channel correspondence mapping data elements and the second channel correspondence mapping data elements corresponding to the lane boundary are selected as foreground correspondence mapping data elements that are used as the output data from which the image space detection data block of image space detection pairs is generated.

22. The system of claim 13, wherein the image processing module is implemented by a neural network.

23. The system of claim 13, wherein the output data is generated by the image processing module based on, in addition to actual frames of the first image and the second image, at least one additional frame of the first image and the second image preceding or succeeding the actual frames.

24. The system of claim 13, wherein the image pair is a stereo image pair of a left image and a right image.

25. A method for training an image processing module, comprising:
controlling a 3D projection loss of the 3D lane detection data block during training of the image processing module by modifying learnable parameters of the image processing module so that the image processing module is configured to generate output data based on an image pair of a first image having a first lane boundary group and a second image having a second lane boundary group, the output data including correspondence mapping data that defines a correspondence between the first lane boundary group and the second lane boundary group, wherein:
an image space detection data block is generated based on the output data, and
the 3D lane detection data block is generated using triangulation and calibration data corresponding to the first image and the second image based on a first part of the image space detection data block corresponding to a first member of a plurality of image space detection pairs and a second part of the image space detection data block corresponding to a second member of the plurality of image space detection pairs.

26. A system for training an image processing module, the system comprising:
a 3D projection loss module adapted for controlling the 3D lane detection data block during the training of the image processing module by modifying learnable parameters of the image processing module so that the image processing module is configured to generate output data based on an image pair of a first image having a first lane boundary group and a second image having a second lane boundary group, the output data including correspondence mapping data that defines a correspondence between the first lane boundary group and the second lane boundary group, wherein
an image space detection data block is generated based on the output data, and
the 3D lane detection data block is generated using triangulation and calibration data corresponding to the first image and the second image based on a first part of the image space detection data block corresponding to a first member of a plurality of image space detection pairs and a second part of the image space detection data block corresponding to a second member of the plurality of image space detection pairs.

* * * * *